United States Patent
Ohara et al.

(10) Patent No.: US 10,993,174 B2
(45) Date of Patent: Apr. 27, 2021

(54) USER APPARATUS, BASE STATION, AND PREAMBLE TRANSMISSION METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/475,546

(22) PCT Filed: Jan. 5, 2018

(86) PCT No.: PCT/JP2018/000094
§ 371 (c)(1),
(2) Date: Jul. 2, 2019

(87) PCT Pub. No.: WO2018/128192
PCT Pub. Date: Jul. 12, 2018

(65) Prior Publication Data
US 2019/0342822 A1  Nov. 7, 2019

(30) Foreign Application Priority Data
Jan. 6, 2017 (JP) .............................. JP2017-001460

(51) Int. Cl.
*H04W 48/10* (2009.01)
*H04W 16/28* (2009.01)
*H04W 72/04* (2009.01)

(52) U.S. Cl.
CPC .......... *H04W 48/10* (2013.01); *H04W 16/28* (2013.01); *H04W 72/04* (2013.01)

(58) Field of Classification Search
CPC ............. H04W 74/0833; H04W 48/10; H04W 74/0633; H04W 16/28; H04W 72/04
See application file for complete search history.

(56) References Cited

U.S. PATENT DOCUMENTS

| 2014/0010178 A1* | 1/2014 | Yu .................... H04W 74/0833 370/329 |
| 2017/0064657 A1* | 3/2017 | Chendamarai Kannan ................ H04W 56/0015 |

(Continued)

FOREIGN PATENT DOCUMENTS

| EP | 3419340 A1 | 12/2018 |
| JP | 2015526015 A | 9/2015 |

(Continued)

OTHER PUBLICATIONS

International Search Report issued for PCT/JP2018/000094, dated Mar. 20, 2018 (5 pages).

(Continued)

*Primary Examiner* — Myron Wyche
(74) *Attorney, Agent, or Firm* — Osha Bergman Watanabe & Burton LLP

(57) ABSTRACT

A user apparatus in a radio communication system including a base station and the user apparatus, including: a reception unit configured to receive a plurality of predetermined signals transmitted from the base station using a plurality of beams; and a transmission unit configured to transmit a preamble using a plurality of resources corresponding to the plurality of beams, wherein the reception unit receives, from the base station, system information including information of the plurality of resources corresponding to the plurality of beams, and the transmission unit obtains the information of the plurality of resources from the system information.

4 Claims, 16 Drawing Sheets

(56) References Cited

U.S. PATENT DOCUMENTS

2018/0248601 A1 8/2018 Kishiyama et al.
2019/0387441 A1* 12/2019 Koskela ............... H04W 36/30
2020/0053800 A1* 2/2020 Deng ................... H04L 5/0048

FOREIGN PATENT DOCUMENTS

| JP | 2015185914 A | 10/2015 |
|----|--------------|---------|
| WO | 2016148127 A1 | 9/2016 |

OTHER PUBLICATIONS

Written Opinion issued for PCT/JP2018/000094, dated Mar. 20, 2018 (5 pages).
3GPP TS 36.321 V14.0.0; "3rd Generation Partnership Project; Technical Specification Group Radio Access Network; Evolved Universal Terrestrial Radio Access (E-UTRA); Medium Access Control (MAC) protocol specification (Release 14)"; Sep. 2016 (96 pages).
Extended European Search Report issued in counterpart European Patent Application No. 18736714.9, dated Apr. 14, 2020 (11 pages).
Samsung; "RA procedure with and without beam correspondence"; 3GPP TSG RAN WG1 #87, R1-1612466; Reno, USA; Nov. 14-18, 2016 (5 pages).
NTT Docomo, Inc.; "Study on New Radio Access Technology"; 3GPP TSG RAN meeting #74, RP-162201; Vienna, Austria; Dec. 5-8, 2016 (148 pages).
Nokia, Alcatel-Lucent Shanghai Bell; "Impact of UE TX/RX Beam correspondence and non-correspondence"; 3GPP TSG-RAN WG1 #87, R1-1612298; Reno, U.S.A.; Nov. 14-18, 2016 (6 pages).
Office Action issued in European Application No. 18736714.9; Dated Jan. 15, 2021 (5 pages).

* cited by examiner

USER APPARATUS, BASE STATION, AND PREAMBLE TRANSMISSION METHOD

TECHNICAL FIELD

The present invention relates to a user apparatus and a base station in a radio communication system.

BACKGROUND ART

In LTE (Long Term. Evolution), random access (RA: Random Access) is performed when a user apparatus establishes a connection with a base station, or performs resynchronization (Non-Patent Document 1).

In 3GPP (3rd Generation Partnership Project), study of a radio communication scheme called 5G has been progressing for realizing further increase of system capacity, further increase of data transmission speed, and lower delay in radio sections and the like. In 5G, in order to satisfy the requirement to make the delay of the radio section equal to or less than 1 ms while realizing throughput equal to or greater than 10 Gbps, studies of various radio techniques are progressing. Since there is a high possibility in that radio techniques different from LTE are adopted in 5G, a radio network supporting 5G is called a new radio network (NR: New Radio) so that 5G is differentiated from a radio network supporting LTE in 3GPP. Note that NewRAT may be referred to as NR.

In 5G, it is assumed that a wide range of frequency from a low frequency band similar to LTE to a frequency band higher than that of LTE is used. Especially, in the high frequency band, since propagation loss increases, it is being studied to apply beam forming of narrow beam width in order to compensate it.

PRIOR ART DOCUMENT

Non-Patent Document

[Non-Patent Document 1] 3GPP TS 36.321 V14.0.0 (2016-09)

SUMMARY OF INVENTION

Problem to be Solved by the Invention

It is considered that in the case of transmitting a signal by applying beamforming, the base station or the user apparatus determines the direction of a transmission beam (Tx-beam) such that reception quality becomes good in the communication partner side by performing beam search (beam sweeping) or the like. In the same way, it is considered that in the case of receiving a signal by applying beamforming, the base station or the user apparatus determines the direction of a reception beam (Rx-beam) such that reception quality from the communication partner side becomes good.

Here, also in NR, it is assumed that a random access procedure similar to the random access procedure in LTE is performed. However, in NR, it is being studied to apply beamforming as described above also in the random access procedure.

However, in the case in which beamforming is applied in the random access procedure, for example, when the user apparatus detects a plurality of base station side transmission beams, which resource to use to report a RA preamble to the base station or the like is not clear in the conventional technique. In the conventional technique, there is a possibility that the random access procedure cannot be appropriately executed in the radio communication system to which beamforming is applied.

The present invention is made in view of the above-described points, and an object of the present invention is to provide a technique that enables a radio communication system having a user apparatus and a base station to appropriately execute a random access procedure to which beamforming is applied.

Means for Solving the Problem

According to a disclosed technique, there is provided a user apparatus in a radio communication system including a base station and the user apparatus, including:

a reception unit configured to receive a plurality of predetermined signals transmitted from the base station using a plurality of beams; and a transmission unit configured to transmit a preamble using a plurality of resources corresponding to the plurality of beams, wherein the reception unit receives, from the base station, system information including information of the plurality of resources corresponding to the plurality of beams, and the transmission unit obtains the information of the plurality of resources from the system information.

Advantage of the Invention

According to a disclosed technique, there is provided a technique that enables a radio communication system having a user apparatus and a base station to appropriately execute a random access procedure to which beamforming is applied.

EMBODIMENTS OF THE INVENTION

Hereinafter, an embodiment of the present invention (present embodiment) will be described with reference to the accompanying drawings. The embodiments described below are only examples and embodiments to which the present invention is applied are not limited to the following embodiments.

In actual operation of the radio communication system of the present embodiment, existing techniques can be appropriately used. The existing techniques are techniques of LTE, for example, but not limited to LTE. In addition, "LTE" used in this specification has a broad meaning including LTE-Advanced and schemes after LTE-Advanced (example: 50) unless otherwise specified.

In the following embodiment described below, terms RA preamble, RAR, messages 1-4, RAR window, SIB, MIB, PBCH, DCI, MAC, RRC and the like which are used in the existing LTE are used, but these terms are only used in convenience of description, signals or functions and the like similar to signals or functions indicated by the terms may be referred to as other names.

Also, in the present embodiment, a random access procedure based on the random access procedure prescribed in LTE is taken as an example. However, the application destination of the present invention is not limited to the random access procedure. The present invention is also applicable to communication procedures other than the random access procedure.

Also, selecting broadcast information/SS associated with a beam can be considered to be synonymous with selecting a beam.

In the following description, embodiments 1 to 3 are described. Before describing the embodiments 1 to 3, a basic example as a technology as a premise of the embodiments 1 to 3 is described. Embodiments 1 to 3 are described as improvement measures against the basic example.

BASIC EXAMPLE

<System Whole Configuration>

Figure 1:
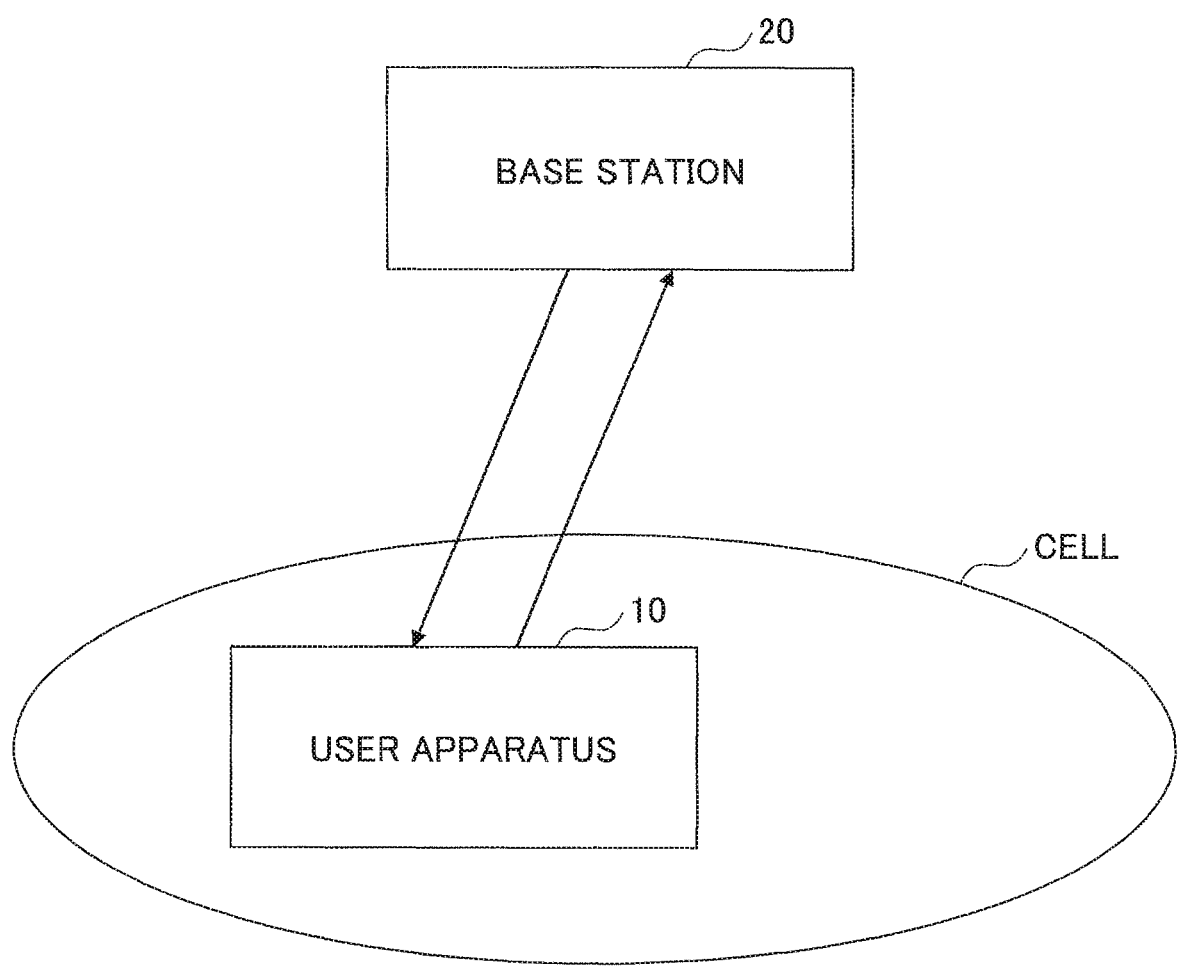
FIG. 1 is a block diagram of a radio communication system in an embodiment of the present invention.

FIG. 1 shows a block diagram of a radio communication system in the present embodiment. The radio communication system of the present embodiment includes a user apparatus 10 and a base station 20 as shown in FIG. 1. In FIG. 1, one user apparatus 10 and one base station 20 are shown, but this is an example and a plurality of user apparatuses 10 and a plurality of base stations 20 may exist.

The user apparatus 10 is a communication apparatus having a radio communication function such as a smartphone, a mobile phone, a tablet, a wearable terminal, a communication module for M2M (Machine-to-Machine), and the like, and the user apparatus 10 connects to the base station 20 by radio to use various communication services provided by the radio communication system. The base station 20 is a communication apparatus that provides one or more cells and performs radio communication with the user apparatus 10. Both of the user apparatus 10 and the base station 20 can perform beamforming to transmit and receive signals.

In the present embodiment, the duplex mode may be TDD (Time Division Duplex) mode or FDD (Frequency Division Duplex) mode.

In the following description, transmitting a signal using a transmission beam is synonymous with sending a signal multiplied by a precoding vector (precoded with a precoding vector). Similarly, receiving a signal using a reception beam is synonymous with multiplying a received signal by a predetermined weight vector. Also, transmitting a signal using a transmission beam may be expressed as sending a signal by using a specific antenna port. Similarly, receiving a signal using a reception beam may be expressed as receiving a signal by using a specific antenna port. Note that an antenna port indicates a logical antenna port defined in the standard of 3GPP. Note that methods for forming the transmission beam and the reception beam are not limited to those described above. For example, a method for changing an angle of each antenna may be used in the user apparatus 10/base station 20 having a plurality of antennas, a method for combining the method using the precoding vector and the method for changing the angle of the antenna may be used, and other methods may be used.

In the following description, a beam used for signal transmission from the base station 20 is referred to as a BS transmission beam, a beam used for signal reception by the base station 20 is referred to as a BS reception beam, a beam used for signal transmission from the user apparatus 10 is referred to as a UE transmission beam, and a beam used for signal reception by the user apparatus 10 is referred to as a UE reception beam.

<On Random Access Procedure>

Figure 2:
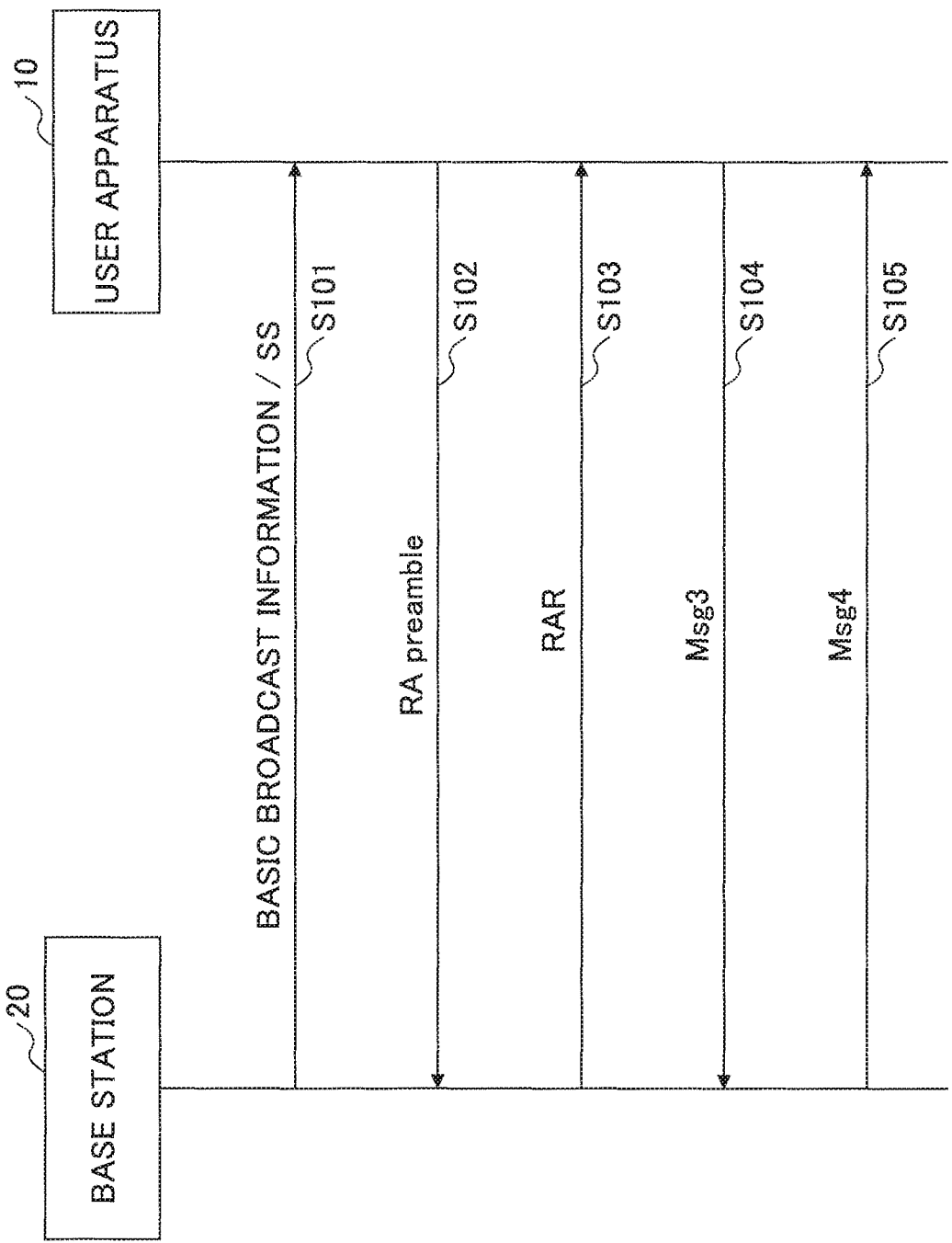
FIG. 2 is a diagram for explaining an example of a random access procedure.

An example of a random access procedure in the present embodiment is described with reference to FIG. 2. In the present embodiment, as an example, a random access procedure similar to the random access procedure in LTE is executed (Non-Patent Document 1). In transmission and reception of signals in the random access procedure, each of the user apparatus 10 and the base station 20 applies a transmission beam and a reception beam. Note that a part of signal transmission and receptions may be omnibus transmission/reception.

The base station 20 performs beam sweeping and transmits basic broadcast information and a synchronization signal (SS: synchronization signal, hereinafter referred to as SS) at predetermined periods respectively for each BS transmission beam (step S101). The transmission periods of the basic broadcast information and the synchronization signal may be the same or may be different. SIB (System Information Block) described later is also transmitted at a predetermined period for each BS transmission beam. SIB may be referred to as "system information". In the basic example, the transmission period of the SIB is longer than the transmission periods of the basic broadcast information and the synchronization signal, and the size of the SIB is larger than the size of any one of the basic broadcast information and the synchronization signal.

Figure 3:
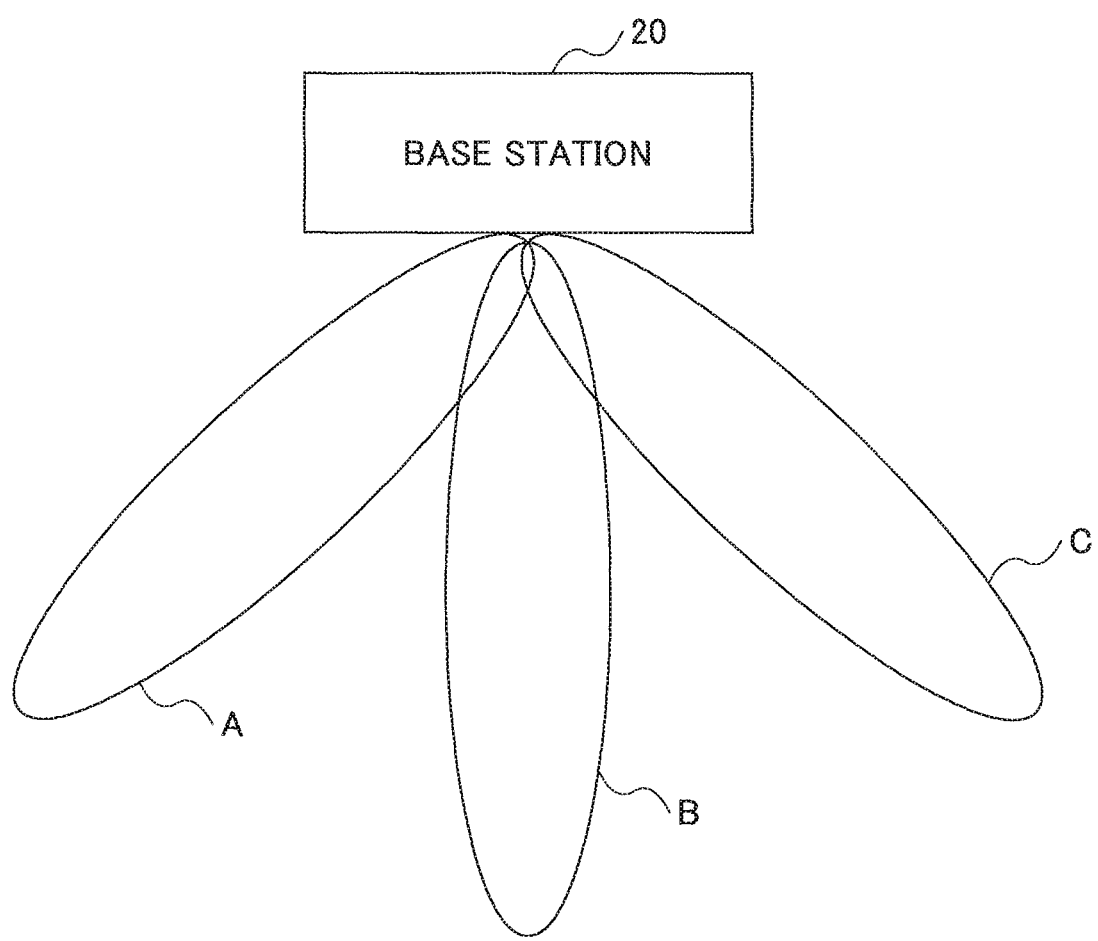
FIG. 3 is a diagram for explaining beams transmitted from the base station 20.

FIG. 3 shows an image of BS transmission beams. In the example of FIG. 3, three transmission beams of A, B and C are shown. In each of the three BS transmission beams, basic broadcast information, a SS, a SIB, and the like are transmitted. In the beam sweeping, for example, BS transmission beams are switched for each time (example: for each symbol).

The basic broadcast information is, for example, basic system information (corresponding to MIB in LTE) transmitted on a PBCH. The SS includes, for example, two types of signals (code sequences) of P-SS and S-SS. The P-SS is a signal for the purpose of symbol timing synchronization, for example, and the S-SS is a signal for the purpose of radio frame synchronization or the like, for example.

By receiving basic broadcast information or a SS or "basic broadcast information and SS" using a BS transmission beam, the user apparatus 10 can identify the BS transmission beam. To identify a BS transmission beam is, for example, to detect an identifier (ID) of the BS transmission beam. An ID of a BS transmission beam may be an antenna port number. For example, an ID of a BS transmission beam may be included in basic broadcast information or may be included in a SS. Also, the ID of the BS transmission beam may be associated with a resource (resource of time and/or frequency) by which the basic broadcast information or the SS is transmitted, so that the user apparatus may identify the BS transmission beam by the resource with which the basic broadcast information or the SS is received.

A block that includes any one of P-SS, S-SS and broadcast information may be referred to as an SS-block. The user apparatus 10 may assume that to receive an SS block transmitted from the base station 20 (to ascertain content of the SS block) is to identify the BS transmission beam associated with the SS block. In this case, for example, the user apparatus 10 identifies an ID of the BS transmission beam from the content of the received SS block or from the resource with which the SS block is received.

In the case where a resource of a SS block is associated with a BS transmission beam, it is not necessary that the "ID of BS transmission beam" to be identified by the user apparatus 10 is an ID assigned for the BS transmission beam (this is referred to as "beam ID"). For example, a time position (Example: symbol index) of the above SS block is associated with the BS transmission beam and is associated with a RACH resource subset which is a resource used to transmit a RA preamble. In this case, the time position (Example: symbol index) can be considered to be the "ID of BS transmission beam". In this case, it is only necessary for the user apparatus 10 to recognize the time position (Example: symbol index) of the SS block. Also, in this case, for example, the beam ID may be included in the basic broadcast information.

That the resource of the SS block is associated with the BS transmission beam means that, for example, in the case where there are a BS transmission beam A and a BS transmission beam B, the same BS transmission beam A is used at a symbol A and the same BS transmission beam B is used at a symbol B every time at a period of a time unit.

When the resource of the SS block is not associated with the BS transmission beam, for example, the base station 20 includes the beam ID in the basic broadcast information and transmits it, so that the user apparatus 10 identifies the BS transmission beam by reading the beam ID transmitted by the basic broadcast information.

The technique in this embodiment can be applied to either of the above two patterns. In step S102 of FIG. 2, the user apparatus 10 transmits a RA preamble (Message 1) using a resource (which is referred to as a RACH resource subset) corresponding to a BS transmission beam of the basic broadcast information and/or the SS (which is represented as "basic broadcast information/SS") that can be received in step S101.

Upon detecting the BA preamble, the base station 20 transmits a RA response (RAR, Message 2) as a response of the RA preamble to the user apparatus 10 (step S103). The user apparatus 10 that receives the RA response transmits a Message 3 including predetermined information to the base station 20 (step S104). The Message 3 is, for example, an RRC connection request.

The base station 20 that receives the Message 3 transmits a Message 4 (example: RRC connection setup) to the user apparatus 10. After the user apparats 10 confirms that predetermined information is included in the Message 4, the user apparatus 10 recognizes that the Message 4 is a Message 4 that corresponds to the Message 3 and that is addressed to the user apparatus 10 itself, then the user apparatus 10 completes the random access procedure. On the other hand, when the user apparatus 10 cannot identify the predetermined information in the Message 4, the user apparatus 10 regards it as failure of random access, so that the user apparatus 10 executes the procedure from transmission of a RA preamble again.

<On Transmission Method of RA Preamble>

An example of a transmission method of RA preamble in the step S102 is described in more detail.

In the present embodiment, the user apparatus 10 selects basic broadcast information/SS that can be received among a plurality of pieces of basic broadcast information/SS transmitted by applying beam sweeping from the base station 20. This is the same as selecting a BS transmission beam that transmits the received basic broadcast information/SS. "Received" here means that, for example, it is received with good reception quality, but it is not limited to this. In addition, the reception quality may be reception quality of the basic broadcast information/SS itself or reception quality of a reference signal that can be received by the basic broadcast information/SS.

In the present embodiment, a BS transmission beam from the base station 20 and a RACH resource subset which is a resource to be used for transmitting a RA preamble from the user apparatus 10 are associated with each other. The user apparatus 10 transmits a PA preamble using a RACH resource subset corresponding to a selected BS transmission beam.

Figure 4:
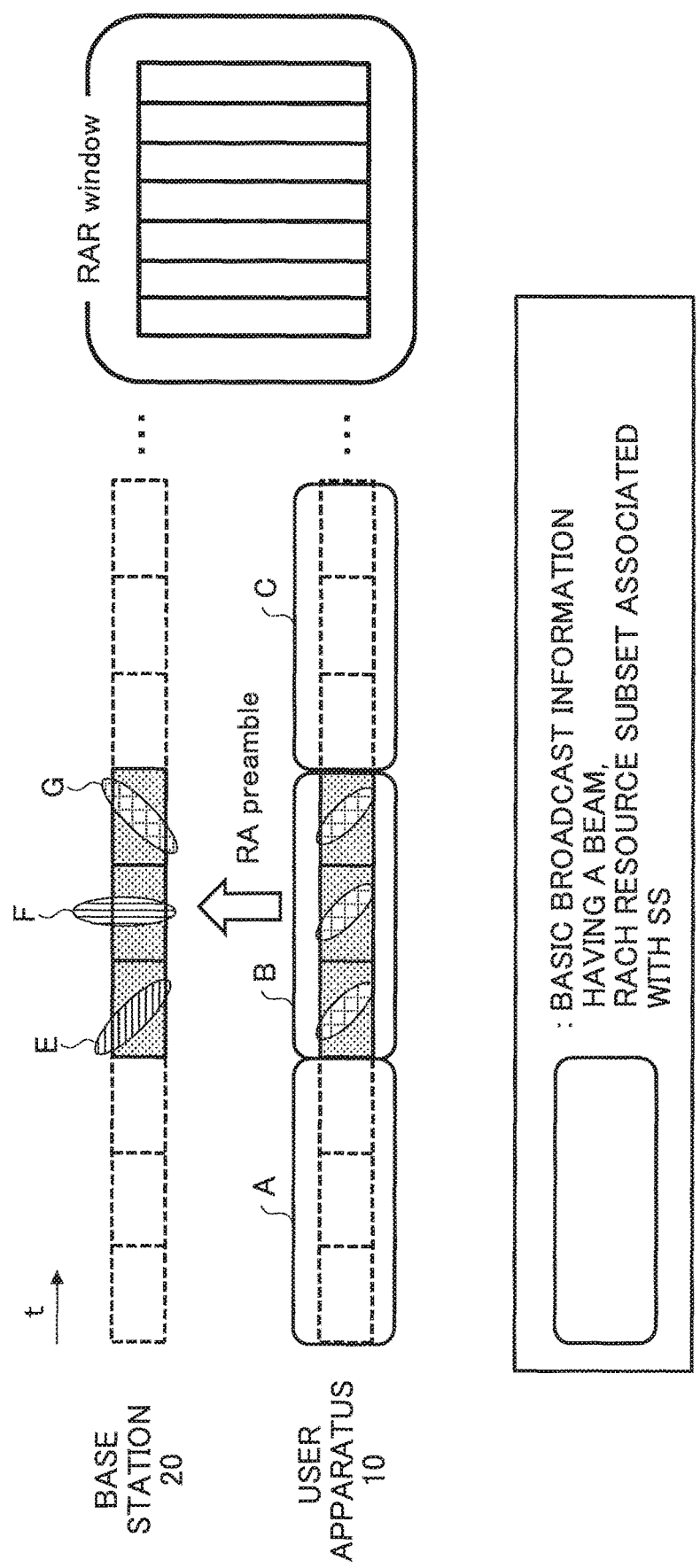
FIG. 4 is a diagram for explaining a transmission method of a RA preamble.

As an example, FIG. 4 shows A, B, and C as RACH resource subsets in the side of the user apparatus 10. The RACH resource subsets A, B, C correspond to the BS transmission beams A, B, C as shown in FIG. 3 respectively, for example. In FIG. 4, a plurality of RACH resource subsets are associated with each BS transmission beam by being divided in the time direction, but this is only an example. A plurality of RACH resource subsets may be associated with each BS transmission beam by being divided in the frequency direction, or a plurality of RACH resource subsets may be associated with each BS transmission beam by being divided in units of time and frequency.

The example of FIG. 4 indicates that the user apparatus 10 can receive basic broadcast information/SS transmitted with the BS transmission beam B, thus, the user apparatus 10 transmits a RA preamble using the RACH resource subset B corresponding to the BS transmission beam B.

Based on a resource of the RA preamble received from the user apparatus 10, the base station 20 can determine basic broadcast information/SS (BS transmission beam) received by the user apparatus 10. In the example of FIG. 4, since the base station 20 receives a RA preamble by the RACH resource subset B, the base station 20 can determine that the BS transmission beam B corresponding to the RACH resource subset B is a proper BS transmission beam that the user apparatus 10 can receive. For example, the base station 20 can use the BS transmission beam B in signal transmission to the user apparatus 10 after that. Note that, in FIG. 4, beams indicated by E, F and G in the base station 20 side indicates BS reception beams, and in this example, as shown in the figure, it is shown that the base station 20 is performing beam sweeping in the reception side.

Also, FIG. 4 shows a RAR window. In the present embodiment, similarly to the existing LTE, when the user apparatus 10 that transmits a RA preamble does not receive a RA response within a predetermined time indicated by the RAR window, it is determined that the random access fails. However, this is an example, and processing different from that of the existing LTE may be performed as processing for determining whether the RA response is successfully received.

The example of FIG. 4 shows a case where the user apparatus 10 can receive the basic broadcast information/SS by using one BS transmission beam. Or the example of FIG. 4 shows a case where the user apparatus 10 can receive the basic broadcast information/SS using a plurality of BS transmission beams, and selects one BS transmission beam that can be received the best (example: reception quality is the best) from the plurality of BS transmission beams.

When the user apparatus 10 receives broadcast information/SS by a plurality of BS transmission beams, the user apparatus 10 may transmit RB preambles using a plurality of RACH resource subsets corresponding to the plurality of BS transmission beams respectively. By transmitting the RA preambles by using a plurality of RACH resource subsets, diversity effect can be obtained.

For example, when there are a plurality of BS transmission beams by which the basic broadcast information/SS (or the reference signal) can be received with good reception quality to the same degree, the user apparatus 10 selects the plurality of BS transmission beams, and transmits a RA preamble by each of a plurality of RACH resource subsets corresponding to the plurality of BS transmission beams. Accordingly, the base station 20 may be able to detect a truly optimal BS transmission beam. Also, since it can be considered that UE transmission beams and/or BS reception beams may be different between a plurality of RACH resource subsets, the base station 20 may be able to receive the RA preamble with the optimal beam.

Figure 5:
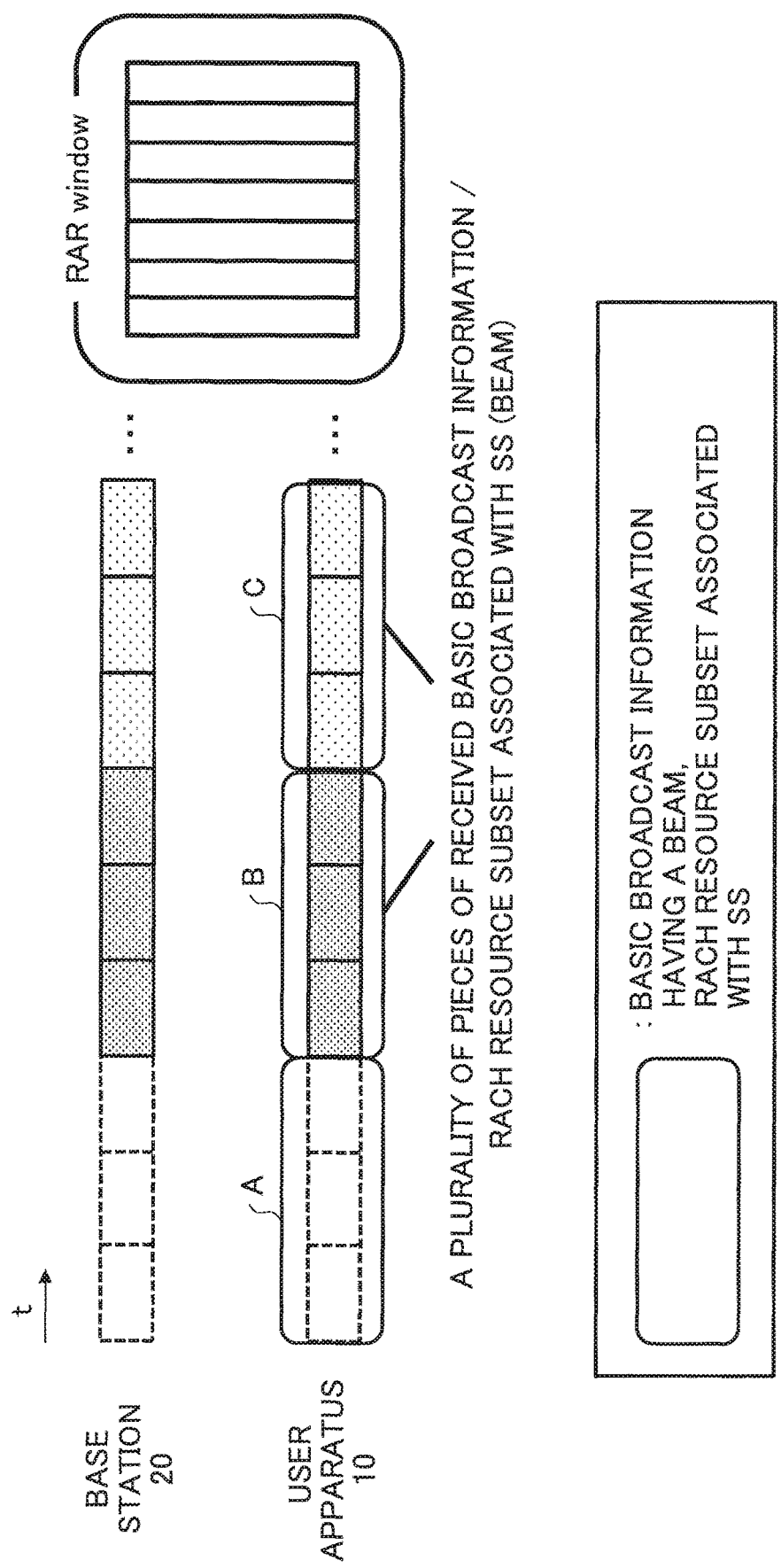
FIG. 5 is a diagram for explaining an operation example in a case in which the user apparatus 10 receives a plurality of pieces of broadcast information/SS.

FIG. 5 shows, as an example, a case in which the user apparatus 10 transmits RA preambles using RACH resource subsets B and C corresponding to BS transmission beams B and C. Note that when transmitting a RA preamble in each of a plurality of RACH resource subsets, the content (sequence) of the RA preambles may be the same or different among the plurality of RACH resource subsets.

<On Method for Notifying of RACH Resource Subsets>

In the present embodiment, the base station 20 transmits information indicating a RACH resource subset corresponding to a BS transmission beam to the user apparatus 10. Based on the information, the user apparatus 10 can know a RACH resource subset corresponding to a BS transmission beam of received basic broadcast information/SS. As an example, in the case in which the user apparatus 10 receives from the base station 20 information indicating a RACH resource subset A as a RACH resource subset corresponding to a BS transmission beam A, if the user apparatus 10 selects the BS transmission beam A to transmit a RA preamble, the user apparatus 10 transmits the RA preamble using the RACH resource subset A.

"Information indicating a RACH resource subset" notified from the base station 20 to the user apparatus 10 may be information indicating a time/frequency resource of the RACH resource subset (example: a resource index), or information indicating a time resource of the RACH resource subset (time position), or may be other information.

In the basic example, the above information is notified, for each BS transmission beam, using a SIB transmitted by the BS transmission beam. That is, in this case, as information of the RACH resource subset included in the SIB, only information of a RACH resource subset corresponding to the BS transmission beam associated with the SIB is included.

After receiving basic broadcast information/SS of a BS transmission beam (BS transmission beam A here), the user apparatus 10 obtains a SIB transmitted by the BS transmission beam. A (SIB corresponding to the BS transmission beam A), reads the SIB and obtains information of the RACH resource subset A corresponding to the BS transmission beam A to transmit a RA preamble using the RACH resource subset A.

As described with reference to FIG. 5, in the case where the user apparatus 10 transmits RA preambles using a plurality of RACH resource subsets, if the above-mentioned notification method of the RACH resource subset (to be referred to as individual notification method) is used, it is necessary that the user apparatus 10 receives a SIB to read information of a RACH resource subset from the SIB for each of the plurality of BS transmission beams corresponding to received basic broadcast/SS. However, if such processing is performed, processing load of the user apparatus 10 becomes high, and delay may occur in transmission of a RA preamble depending on the transmission period of the SIB. A technique for solving the problem is described as an embodiment 1. After the embodiment 1, embodiments 2 and 3 are described.

Embodiment 1

The embodiment 1 includes an embodiment 1-1, embodiment 1-2, and embodiment 1-3, each of which will be described below. In the following description of embodiments 1-1 to 1-3, improved parts (that is, changed parts) to the technique of the basic example described so far are described. Therefore, the basic example applies unless otherwise stated.

Each of the embodiments 1-1, 1-2, and 1-3 may be carried out individually or in combination as appropriate. For example, embodiments 1-1 and 1-2 may be combined, embodiments 1-1 and 1-3 may be combined, or embodiments 1-2 and 1-3 may be combined, and embodiments 1-1, 1-2 and 1-3 may be combined.

Embodiment 1-1

In the embodiment 1-1, a SIB of each BS transmission beam of the plurality of BS transmission beams includes information of a RACH resource subset corresponding to a BS transmission beam other than the BS transmission beam of the SIB in addition to information of the RACH resource subset corresponding to the BS transmission beam of the SIB.

For example, a SIB of each BS transmission beams in all BS transmission beams used for beam sweeping may include correspondence information indicating correspondence between a BS transmission beam and a RACH resource subset for each of all BS transmission beams used for heart sweeping.

Figure 6:
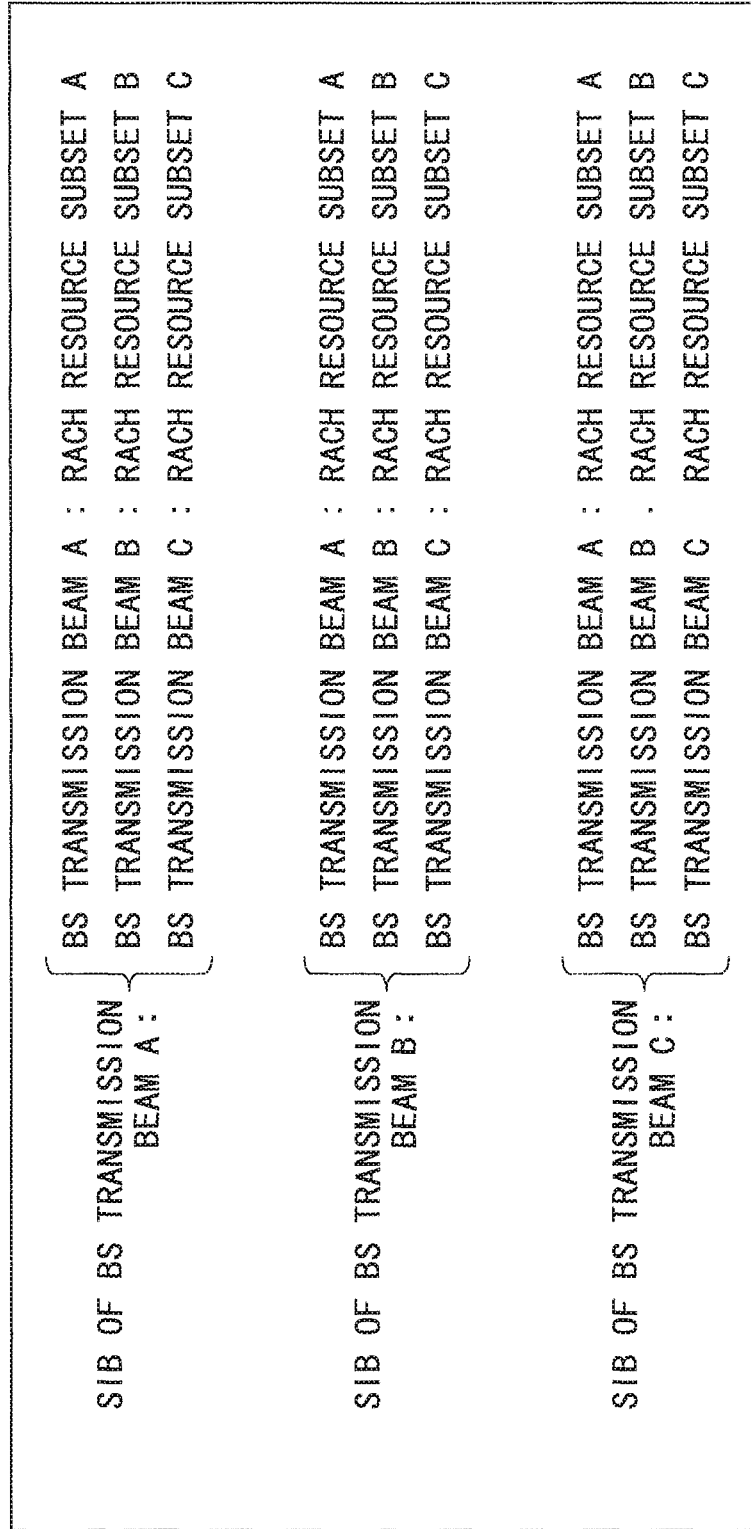
FIG. 6 is a diagram for explaining an embodiment 1-1.

FIG. 6 shows an example of correspondence information in the case where BS transmission beams A, B and C are used for beam sweeping. In thus example, as shown in FIG. 6, a SIB of the BS transmission beam. A includes information indicating that a RACH resource subset A and a BS transmission beam A are associated with each other, a RACH resource subset B and a BS transmission beam B are associated with each other, and a RACH resource subset C and a BS transmission beam C are associated with each other. Also, as shown in FIG. 6, each of a SIB of the BS transmission beam B and a SIB of the BS transmission beam C includes information similar to the information included in the SIB of the BS transmission beam A.

Also, for example, a SIB of each BS transmission beam of all BS transmission beams used for beam sweeping may include correspondence information indicating correspondence between a BS transmission beam and a RACH resource subset for a part of BS transmission beam(s) in all BS transmission beams used for beam sweeping. With respect to a SIB of a BS transmission beam, the part of BS transmission beams are the BS transmission beam and one or a plurality of BS transmission beams adjacent to the BS transmission beam.

Figure 7:
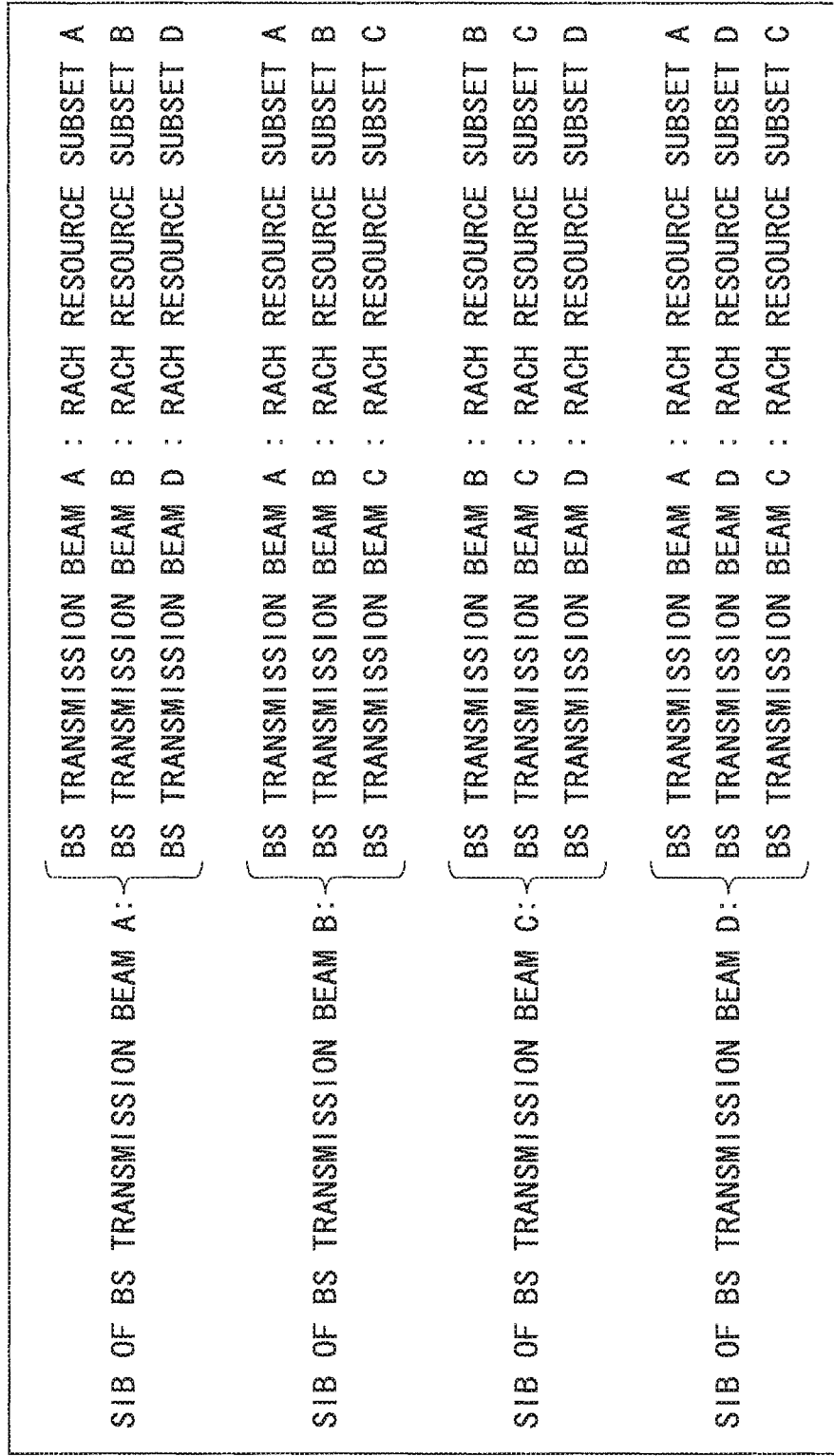
FIG. 7 is a diagram for explaining an embodiment 1-1.

FIG. 7 shows an example of a case in which a SIB includes correspondence information indicating correspondence between a BS transmission beam and a RACH resource subset for a part of BS transmission beams. In this example, BS transmission beams used for beam sweeping are BS transmission beams A, B, C and D, in which A is adjacent to B and D, B is adjacent to A and C, C is adjacent to D and B, and D is adjacent to A and C. In this case, as shown in FIG. 7, the SIB of the BS transmission beam A includes correspondence information on the BS transmission beam. A, the BS transmission beam B, and the BS transmission beam D. Similarly, as for SIBs of the BS transmission beams B-D, correspondence information based on adjacency relationship is included.

In this embodiment, it is assumed that a SIB associated with a certain BS transmission beam is transmitted with the BS transmission beam. However, a SIB associated with a certain BS transmission beam may be transmitted with a BS transmission beam other than the associated BS transmission beam or by omnibus beams.

For example, in the case in which BS transmission beams A-D are used for beam sweeping and SIBs shown in FIG. 7 are transmitted from the base station 20 to the user apparatus 10 by each BS transmission beam, it is assumed that the user apparatus 10 receives basic broadcast information/SS by each of the BS transmission beam. A and the BS transmission beam B, and selects the BS transmission beam A and the BS transmission beam B. In this case, for example, the user apparatus 10 can obtain information of the RACH resource subset A corresponding to the BS transmission beam A and information of the RACH resource subset B corresponding to the BS transmission beam B only by obtaining a SIB of the BS transmission beam. A among the SIB of the BS transmission beam A and a SIB of the BS transmission beam. B. The user apparatus 10 transmits a RA preamble using the RACH resource subset A and transmits a RA preamble using the RACH resource subset B.

Also, in the case of FIG. 7, for example, if the user apparatus 10 selects BS transmission beams A-D, the user apparatus 10 can obtain information of a RACH resource subset corresponding to each BS transmission beam by obtaining a SIB of the BS transmission beam A and a SIB of the BS transmission beam B.

According to the embodiment 1-1, since the number of SIBs to be acquired in the user apparatus 10 can be reduced, the processing load is reduced and the processing can be performed quickly.

Embodiment 1-2

In the embodiment 1-2, broadcast information whose size is smaller than that of a SIB and whose transmission period is shorter than that of a SIB is provided, and the broadcast information includes information of a RACH resource subset corresponding to a BS transmission beam for transmitting the broadcast information.

Figure 8:
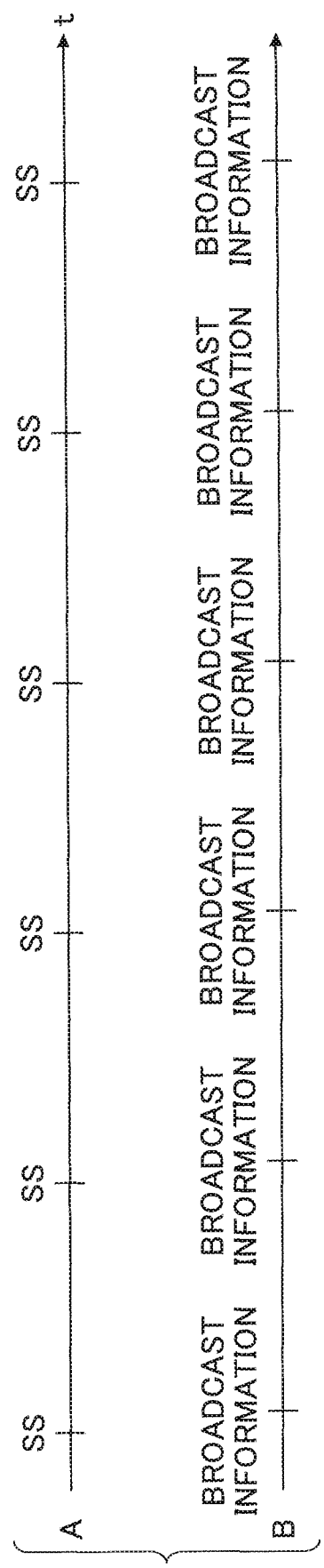
FIG. 8 is a diagram for explaining an embodiment 1-2.

The transmission period of the broadcast information having the transmission period shorter than that of the SIB may be the same as a transmission period of the SS, for example. FIG. 8 shows an image of transmission (reception for the user apparatus 10) timing of the broadcast information in this case. A in FIG. 8 shows transmission timing of the SS, and B in FIG. 8 shows transmission timing of broadcast information.

Basic broadcast information of a BS transmission beam may include information of a RACH resource subset corresponding to the BS transmission beam. That is, the above basic broadcast information may be basic broadcast information described in the basic example. Note that the size of the basic broadcast information is smaller than the size of the SIB, and the transmission period of the basic broadcast information is shorter than the transmission period of the SIB.

The base station 20 transmits the above-mentioned broadcast information or basic broadcast information for each BS transmission beam. For example, in the case where BS transmission beams A-D are used for beam sweeping, it is assumed that the user apparatus 10 receives the basic broadcast information/SS by each of the BS transmission beam. A and the BS transmission beam B, and selects the BS transmission beam A and the transmission beam B. In this case, for example, the user apparatus 10 acquires information of the RACH resource subset A corresponding to the BS transmission beam A from the broadcast information or the basic broadcast information of the BS transmission beam A, and acquires information of the RACH resource subset B corresponding to the BS transmission beam B from the broadcast information or the basic broadcast information of the BS transmission beam B. Then, the user apparatus 10 transmits a RA preamble by the RACH resource subset A and transmits a RA preamble by the RACH resource subset B.

In the embodiment 1-2, when acquiring information of a RACH resource subset, the user apparatus 10 reads the broadcast information or the basic broadcast information whose size is smaller than that of the SIB, so that the processing load can be reduced as compared with the basic example. Also, since the user apparatus 10 reads the broadcast information or the basic broadcast information having a transmission period shorter than that of the SIB, the delay can be reduced as compared with the basic example.

Embodiment 1-3

In the embodiment 1-3, like the basic example, a SIB of a BS transmission beam includes only information of a RACH resource subset corresponding to the BS transmission beam. In addition, in the embodiment 1-3, relative relationship of resource positions of basic broadcast information/SS among BS transmission beams is associated with relative relationship of resource positions of RACH resource subsets among BS transmission beams. Information indicating this association (correspondence relationship) may be information preconfigured in the user apparatus 10 and the base station 20, or may be information that is determined by the base station 20 and that is configured in the user apparatus 10 by upper layer signaling and the like.

Figure 9:
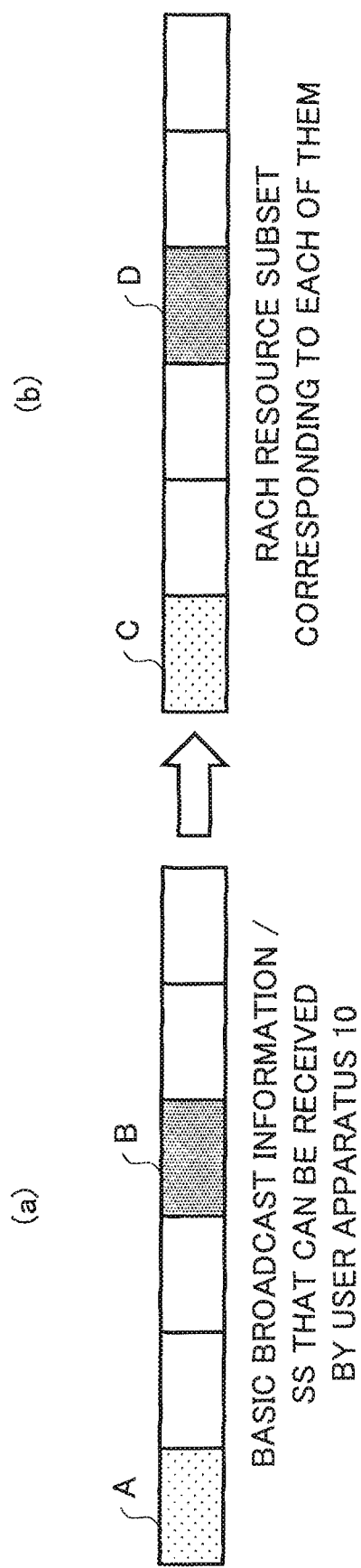
FIG. 9 is a diagram for explaining an embodiment 1-3.

For example, a correspondence relationship is defined such that, when a value obtained by subtracting a value indicating a resource position of basic broadcast information/SS in the BS transmission beam A from a value indicating a resource position of basic broadcast information/SS in the BS transmission beam. B is Δ (the unit of Δ may be time, frequency, time and frequency index, or may be other than these), a value obtained by subtracting a value indicating a resource position of a RACH resource subset corresponding to the BS transmission beam A from a value indicating a resource position of a RACH resource subset corresponding to the BS transmission beam B is also Δ. FIG. 9 shows an example in the case where Δ is 3. That is, a correspondence relationship is defined between relative relationship of A and B shown in FIG. 9(a) and relative relationship of C and D shown in FIG. 9(b) (relationship that the difference is the same, in the example of FIG. 9).

Note that the correspondence relationship may be, for example, information defined for each set of BS transmission beams (two BS transmission beams) in a plurality of BS transmission beams used in beam sweeping, or may be other information. An operation example is as follows when the above-mentioned correspondence relationship (correspondence relationship using Δ) is defined.

For example, in the case where BS transmission beams A-D are used for beam sweeping, it is assumed that the user apparatus 10 receives basic broadcast information/SS by each of the BS transmission beam A, the BS transmission beam B, and the BS transmission beam C, and selects the BS transmission beam A, the BS transmission beam B, and the BS transmission beam C.

For example, the user apparatus 10 receives a SIB of one (BS transmission beam A as an example here) of the BS transmission beam A, the BS transmission beam B, and the BS transmission beam C, and reads information of the RACH resource subset A corresponding to the BS transmission beam A from the SIB. Then, the user apparatus 10 specifies the RACH resource subset B corresponding to the BS transmission beam B and the RACH resource subset C corresponding to the BS transmission beam C based on the correspondence relationship between the relative relationship of resource positions or the basic broadcast information/SS among the transmission beams A to C and the relative relationship of resource positions of the RACH resource subsets among the transmission beams A to C.

More specifically, for example, it is assumed that a value obtained by subtracting a value indicating the resource position of the basic broadcast information/SS in the BS transmission beam A from a value indicating the resource position of the basic broadcast information/SS in the BS transmission beam B is Δ1, a value obtained by subtracting the value indicating the resource position of the basic broadcast information/SS in the BS transmission beam A from a value indicating the resource position of the basic broadcast information/SS in the BS transmission beam C is Δ2, and that the resource position of the RACH resource subset A corresponding to the BS transmission beam A is P. In this case, for example, the user apparatus 10 can obtain the resource position of the RACH resource subset B corresponding to the BS transmission beam B as P+Δ1, and the user apparatus 10 can obtain the resource position of the RACH resource subset C corresponding to the BS transmission beam C as P+Δ2.

According to the embodiment 1-3, the processing load on the user apparatus 10 is reduced and the speed of the processing increases.

Embodiment 2

Next, an embodiment 2 is described. The embodiment 2 is based on the embodiment 1. However, the embodiment 2 may be based on the basic example without premising on the embodiment 1. In the embodiment 2, a technique on a transmission procedure is described in the case in which the user apparatus 10 transmits RA preambles using a plurality of RACH resource subsets corresponding to a plurality of BS transmission beams associated with a plurality of pieces of received basic broadcast information/SS.

Figure 10:
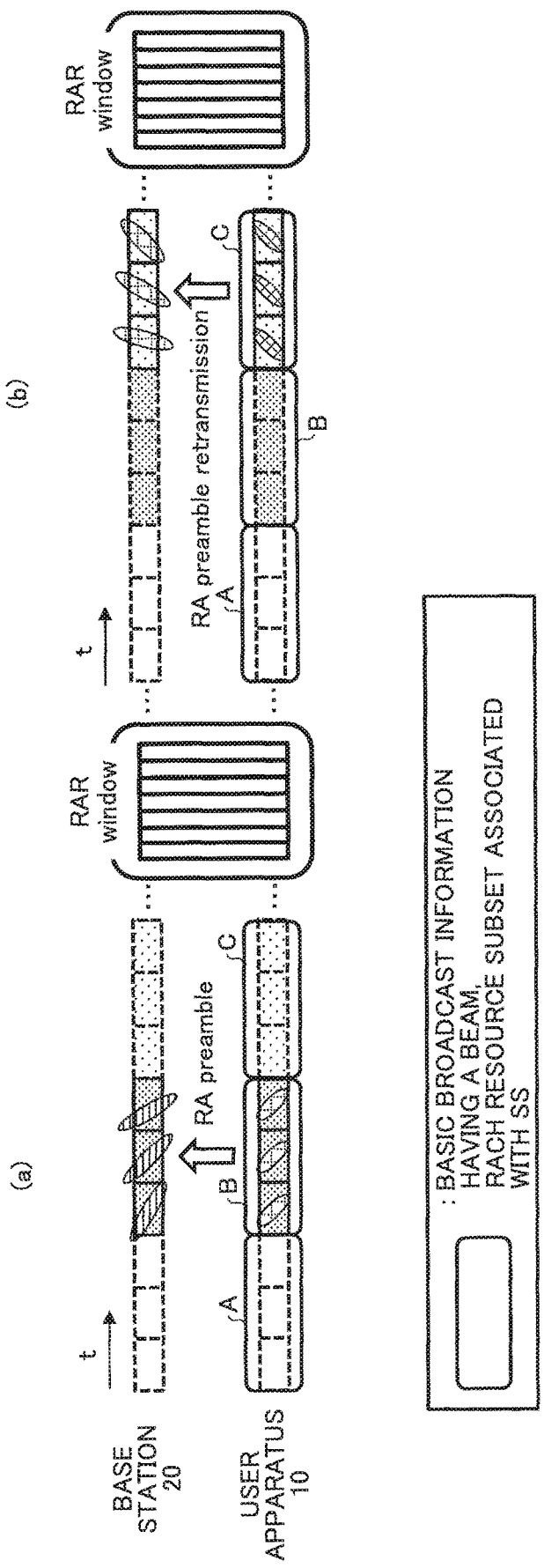
FIG. 10 is a diagram for explaining an example 1 of a transmission method of a RA preamble in an embodiment 2.

With reference to FIG. 10, an example 1 of a RA preamble transmission method in the embodiment 2 is described. The example shown in FIG. 10 shows an example in a case where a EACH resource subset B and a RACH resource subset C are selected as a plurality of RACH resource subsets for transmitting RA preambles. This premise is the same also for the after-mentioned example 2 (FIG. 11).

As shown in FIG. 10(a), in the example 1, first, the user apparatus 10 transmits a RA preamble of initial transmission using one RACH resource subset B of a plurality of RACH resource subsets. In this example, for example, since the user apparatus 10 cannot receive a RAR in a RAP window, the user apparatus 10 determines to retransmit the RA preamble.

As shown in FIG. 10(b), the user apparatus 10 performs RACH resource switching upon retransmission and performs retransmission using another RACH resource subset C. In the example 1, there is a possibility that the random access procedure takes time depending on the number of received pieces of broadcast information/SS (the number of received BS transmission beams).

Figure 11:
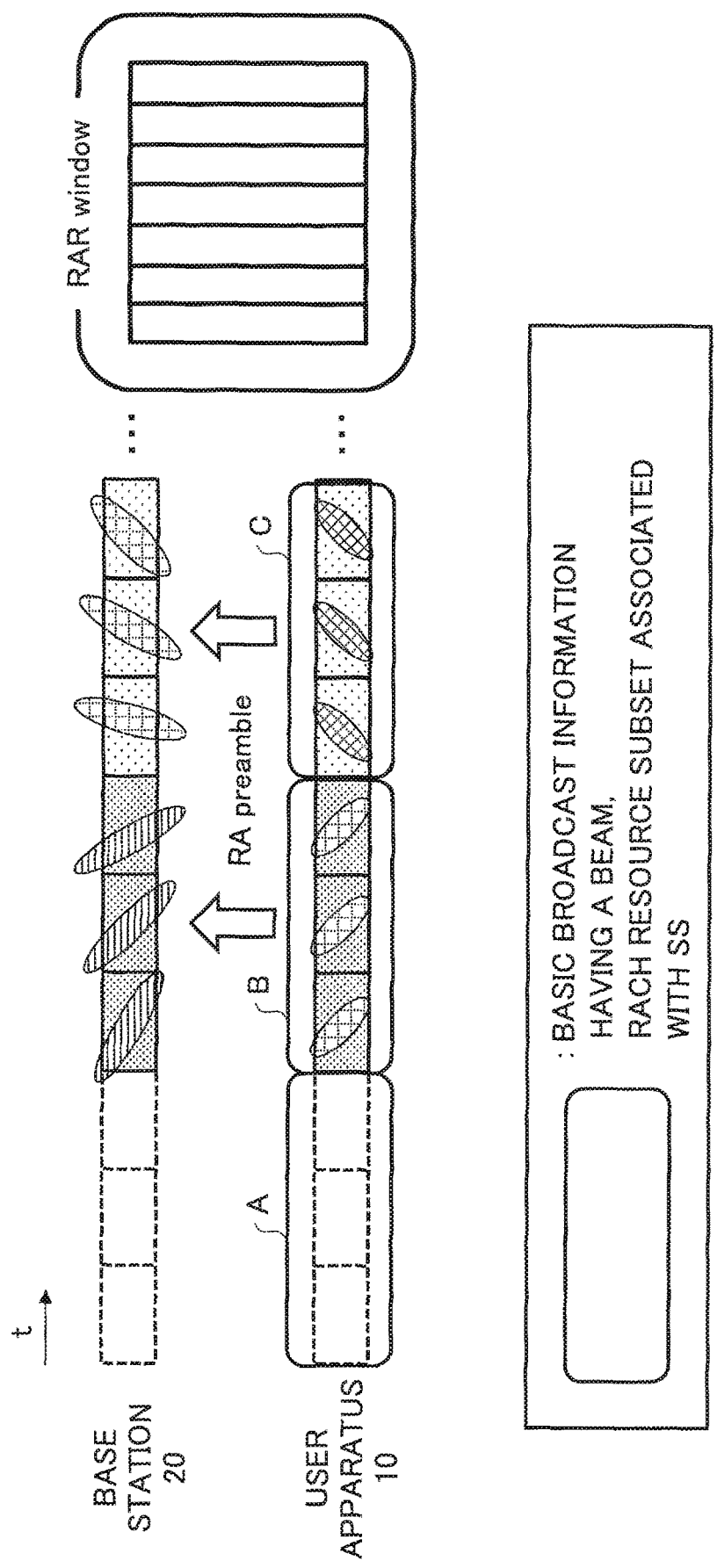
FIG. 11 is a diagram for explaining an example 2 of a transmission method of a RA preamble in an embodiment 2.

With reference to FIG. 11, an example 2 of the RA preamble transmission method in the embodiment 2 is described.

As shown in FIG. 11, in the example 2, the user apparatus 10 transmits RA preambles at the same time without waiting for a RAR window (before retransmission) by using the RACH resource subsets B and C corresponding to a plurality of BS transmission beams respectively. Also, the user apparatus 10 may transmit BA preambles simultaneously using a part of (one or a plurality of) RACH resource sunset (s) among a plurality of RACH resource subsets selected for transmission of BA preambles and use the remaining (one of a plurality of) RACH resource subset(s) for retransmission. For example, in the case where the RACH resource subsets B and C are different resources in the time domain, as shown in FIG. 11, although it is not strictly "simultaneous" to transmit the RA preambles using the RACH resource subsets B and C without waiting for the RAR window, in the second embodiment, such a case is also referred to as "simultaneous". That is, the case where transmission is performed by using a plurality of RACH resource subsets without waiting for the RAR window is referred to as "simultaneous".

In the example 2, the base station 20 can determine an optimal one among a plurality of BS transmission beams at an early timing without waiting for retransmission of a RA preamble. However, in the example 2, in the case where a plurality of user apparatuses freely select and transmit RA preambles using a plurality of RACH resource subsets, there is a possibility that collision occurs more frequently.

Thus, in the embodiment 2, in the case where transmission of RA preambles is performed by using a plurality of RACH resource subsets like the example 2, the number of usable types of sequences of RA preambles (the number of usable RA preambles) are restricted, usable groups of RA preamble sequences (usable RA preamble groups) are restricted, or the number of RACH resource subsets that can be used for simultaneous transmission of RA preambles are restricted.

Here, the above-mentioned "the number of usable RA preambles", "usable RA preamble groups" and "the number of usable RACH resource subsets" are to be referred to as "transmission method of RA preamble".

Figure 12:
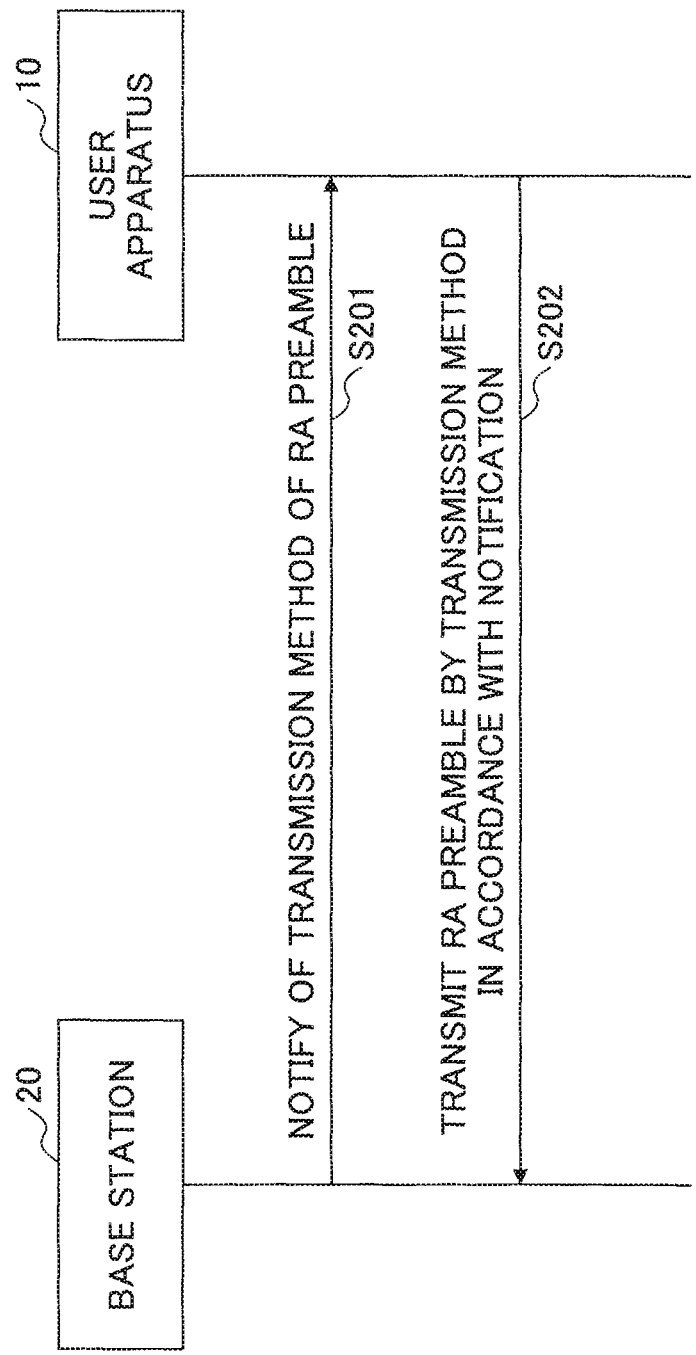
FIG. 12 is a sequence diagram in a case where the base station 20 indicates a transmission method of a RA preamble to the user apparatus 10.

As shown in FIG. 12, the transmission method of RA preamble is notified from the base station 20 to the user apparatus 10 by basic broadcast information/SS, system information, DCI, MAC signal, or RRC signaling, for example (step S201). The user apparatus 10 transmits a RA preamble by the transmission method according to the notification from the base station 20 (step S202).

Instead of notifying of the transmission method of RA preamble from the base station 20 to the user apparatus 10, the transmission method of RA preamble may be configured in advance in each of the user apparatus 10 and the base station 20.

When the number of usable RA preambles is restricted, the number of RA preambles is specified as the transmission method of RA preamble. As an example, it is assumed that the user apparatus 10 detects three BS transmission beams and grasps RACH resource subsets A, B and C for RA preamble transmission. In this case, for example, if 2 is specified as the number of RA preambles, the user apparatus 10 transmits the same RA preamble in each of two RACH resource subsets of the RACH resource subsets A, B, and C, and transmits another RA preamble using the remaining one RACH resource subset.

When restricting group (s) of usable RA preambles, the group(s) of the RA preambles is (are) specified as the transmission method of RA preambles. One group may be specified, or a plurality of groups may be specified.

For example, it is assumed that there are N (N is an integer equal to or greater than 2) RA preambles as a whole, and N RA preambles are divided to a group 1 (N1 RA preambles), a group 2 (N2 RA preambles), and a group 3 (N3 RA preambles). N1+N2+N3=N holds true.

As an example, it is assumed that the user apparatus 10 detects three BS transmission beams and grasps RACH resource subsets A, B and C for RA preamble transmission. In this case, for example, when the group 1 is specified as a group of RA preambles, the user apparatus 10 transmits a RA preamble selected from the group 1 in each of the RACH resource subsets A, B and C. For example, when the group 1 and the group 2 are specified as groups of RA preambles, the user apparatus 10 transmits a RA preamble selected from the group 1 and the group 2 in each of the RACH resource subsets A, B and C.

As described above, by restricting the number or the group of RA preambles that can be used by each user apparatus, the collision probability of RA preambles between user apparatuses can be reduced.

When the number of usable RACH resource subsets are restricted, the number of RACH resource subsets is specified as the transmission method of RA preamble. As an example, it is assumed that the user apparatus 10 detects three BS transmission beams and grasps RACH resource subsets A, B, C for RA preamble transmission. In this case, for example, when 2 is specified as the number of RACH resource subsets, the user apparatus 10 transmits RA preambles using two RACH resource subsets of the RACH resource subsets A, B and C. When 2 is specified as the number of RACH resource subsets, only two RACH resource subsets may be specified in the stage in which a plurality of RACH resource subsets for RA preamble transmission are specified.

In the embodiment 2, the example 1 described with reference to FIG. 10 and the example 2 described with reference to FIG. 11 may be switched by signaling or the like from the base station 20 to the user apparatus 10. When the base station 20 instructs the user apparatus 10 to execute the example 1, the number of RACH resource subsets that the user apparatus 10 can simultaneously use is limited to one. When the base station 20 instructs the user apparatus 10 to execute the example 2, the user apparatus 10 can freely select the number of RACH resource subsets and the number of RA preambles. Or, when the base station 20 instructs the user apparatus 10 to execute the example 2, in addition to the instruction, "the number of usable RA preamble", "group of usable RA preambles" or "the number of usable RACH resource subsets" may be indicated.

Also, in the embodiment 2, separately from the restriction notification such as "the number of usable RA preambles", "group of usable RA preambles" and "the number of usable RACH resource subsets", the base station 20 may instruct the user apparatus 10 whether to allow simultaneous transmission using a plurality of RACH resource subsets by a signaling and the like, and the base station 20 may instruct the user apparatus, by a signaling and the like, whether to allow use of a EACH resource subset, for retransmission of a RA preamble, that is different from a EACH resource subset used for previous RA preamble transmission.

As described above, by restricting the number of EACH resource subsets that can be used by each user apparatus, it becomes easy for the base station 20 to identify the RACH resource subset. Also, by reducing the number of EACH resource subsets used for simultaneous transmission, the number of RACH resource subsets that can be used for retransmission increases.

Embodiment 3

In the embodiment 3, it is assumed that RA preambles are simultaneously transmitted using a plurality of RACH resource subsets as explained in the example 2 (FIG. 11) in the embodiment 2. Note that restriction of the number or group of RA preambles/restriction of the number of RACH resource subsets described in the embodiment 2 may be applied or may not be applied. Also, in the embodiment 3, the method for specifying a plurality of RACH resource subsets in the embodiment 1 may be applied or may not be applied.

In the embodiment 3, an example of a transmission method of a RA response (RAR) from the base station 20 is described when simultaneously transmitting one type (one sequence) of RA preamble using a plurality of RACH resource subsets. The embodiment 3 includes an embodiment 3-1 and an embodiment 3-2, and each of them is described as follows.

Embodiment 3-1

In the embodiment 3-1, the base station 20 transmits one RAR for each received RACH resource subset. Each PAR contains information indicating which RACH resource subset the RAR corresponds to (example: index of RACH resource subset) and one Msg 3 scheduling grant. Also, instead of explicitly including the above information (information indicating the RACH resource subset and/or Msg3 scheduling grant) within the RAR, the base station 20 may notify the user apparatus 10 of the above information using a resource position of time and/or frequency for transmitting the RAR.

Figure 13:
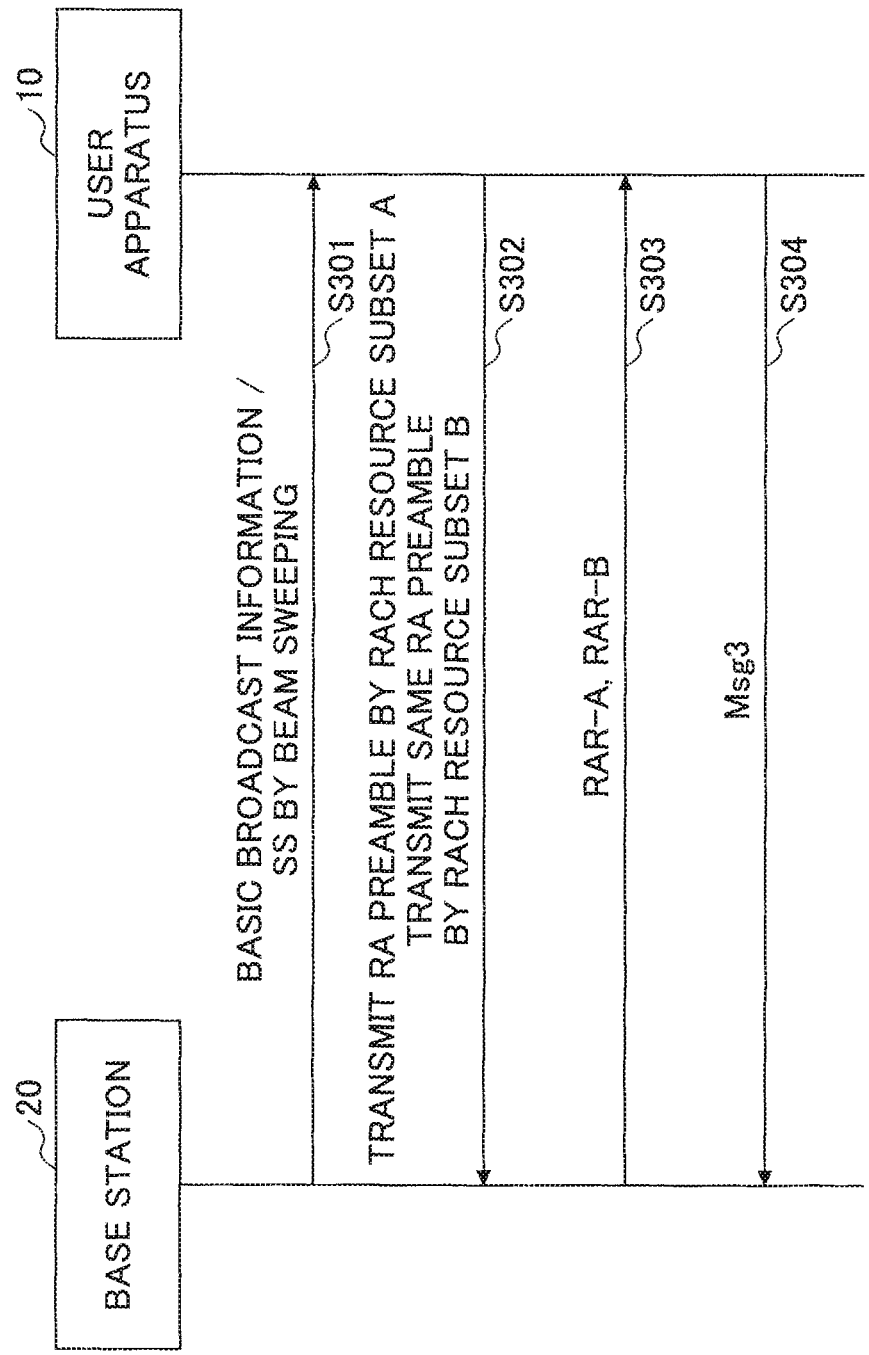
FIG. 13 is a diagram for explaining an embodiment 3-1.

A concrete example of the embodiment 3-1 is described with reference to FIG. 13. In step S301, basic broadcast information/SS is transmitted from the base station 20 to the user apparatus 10 by beam sweeping. In the user apparatus 10, a plurality of BS transmission beams are selected, and a plurality of RACH resource subsets corresponding to the plurality of BS transmission beams are specified. Here, it is assumed that the plurality of RACH resource subsets are a RACH resource subset A and a RACH resource subset B.

In step S302, the user apparatus 10 transmits a RA preamble using the RACH resource subset A and transmits the same RA preamble using the RACH resource subset B.

In step S303, the base station 20 transmits a RAR-A for the RA preamble received by the RACH resource subset A and a RAR-B for the RA preamble received by the RACH resource subset B to the user apparatus 10. For example, the RAR-A includes information indicating that a RA preamble is received by the RACH resource subset A and a Msg 3 scheduling grant, and the RAR-B includes information indicating that a RA preamble is received by the RACH resource subset B and a Msg scheduling grant. An UL resource specified by the Msg3 scheduling grant included in the RAR-A is different from an UL resource specified by the Msg3 scheduling grant included in the RAR-B.

In step S304, the user apparatus 10 transmits a Msg 3 by the CL resource specified by the Msg 3 scheduling grant included in the RAR-A and a Msg 3 by the UL resource specified by the Msg 3 scheduling grant included in the RAR-B. The base station 20 can identify which RACH resource subset the Msg3 corresponds to based on the resource by which the Msg3 is received.

Embodiment 3-2

In the embodiment 3-2, the base station includes, in one RAR, information on all received RACH resource subsets, and transmits the one RAR. For example, one BAR includes indexes of all received RACH resource subsets and Msg3 scheduling grants corresponding to each RACH resource subset.

Figure 14:
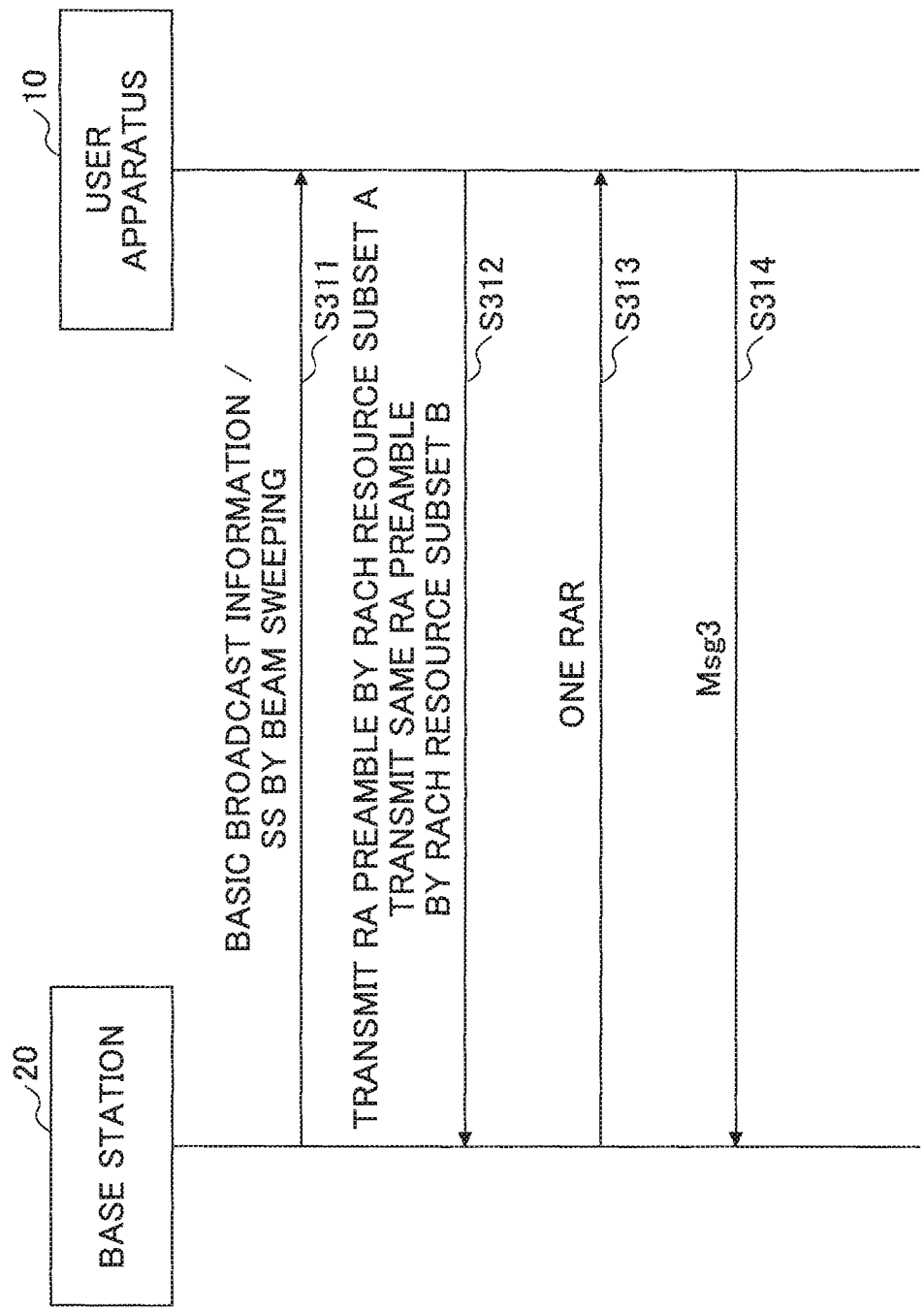
FIG. 14 is a diagram for explaining an embodiment 3-2.

A concrete example of the embodiment 3-2 is described with reference to FIG. 14. In step S311, basic broadcast information/SS is transmitted from the base station 20 to the user apparatus 10 by beam sweeping. In the user apparatus 10, a plurality of BS transmission beams are selected, and a plurality of RACH resource subsets corresponding to the plurality of BS transmission beams are specified. Here, it is assumed that the plurality of RACH resource subsets are a RACH resource subset A and a RACH resource subset B.

In step S312, the user apparatus 10 transmits a RA preamble using the RACH resource subset A and transmits the same RA preamble using the RACH resource subset B.

In step S313, the base station 20 transmits one RAR that includes information indicating that a RA preamble is received by the RACH resource subset A (example: index of RACH resource subset A), a Msg3 scheduling grant corresponding to the RACH resource subset A, information indicating that a RA preamble is received by the RACH resource subset B (example: index of RACH resource subset B), and a Msg3 scheduling grant corresponding to the RACH resource subset B.

In step S314, the user apparatus 10 transmits a Msg 3 by the UL resource specified by the Msg 3 scheduling grant corresponding to the RACH resource subset A and a Msg 3 by the UL resource specified by the Msg 3 scheduling grant corresponding to the BAH resource subset A.

By utilizing a resource position of time and/or frequency by which the RAR is transmitted, the base station 20 may notify of the information to be included in the RAR as relative position relationship without explicitly including the information in the RAR.

For example, it is assumed that a resource position of time and/or frequency of the RAR is associated with an UL resource position specified by the Msg3 scheduling grant, and that the user apparatus 10 and the base station 20 has information (to be referred to as correspondence information 1) of the correspondence relationship. Also, it is assumed that relative relationship of resource positions among a plurality of RACH resource subsets is associated, in advance, with relative relationship of UL resource positions among a plurality of Msg3 scheduling grants corresponding to the plurality of RACH resource subsets, and that the user apparatus 10 and the base station 20 has information (to be referred to as correspondence information 2) of the correspondence relationship.

Here, for example, in the case where the base station 20 receives RA preambles by the RACH resource subset A and the RACH resource subset B, the base station 20 includes, in a BAR, an index of the RACH resource subset A and an index of the RACH resource subset B, and transmits the RAR using a (resource corresponding to an UL resource (resource for transmitting Msg3) that corresponds to the RACH resource subset A. Based on the correspondence information 1 and the resource by which the RAR is received, the user apparatus 10 grasps the UL resource corresponding to the RACH resource subset A. Also, the user apparatus 10 grasps an UL resource corresponding to the RACH resource subset B based on the correspondence information 2. As an example, in the case where a correspondence relationship is used in which if RACH resource subsets are separated by 3, UL resources for transmitting Msg3 are also separated by 3, the user apparatus 10 determines, based on the correspondence information 2, a resource obtained by adding 3 to (or subtracting 3 from) an UL resource for transmitting a Msg3 corresponding to the RACH resource subset A to be an UL resource for transmitting a Msg3 corresponding to the RACH resource subset B.

As described in the embodiment 3-1 and the embodiment 3-2, in the embodiment 3, the user apparatus 10 can transmit a plurality of identifiable Msg3s when receiving a plurality of RARs (or when receiving information corresponding to a plurality of RARs like the embodiment 3-2). By the processing, for example, in the case where the user apparatus 10 transmits one RA preamble using a plurality of RACH resource subsets, even when another user apparatus uses a RA preamble the same as the RA preamble, collision can be avoided if there is at least one different RACH resource subset between the user apparatus 10 and the other user apparatus. That is, the probability of success of the random access procedure can be improved.

(Apparatus Configuration)

An example of the functional configurations of the user apparatus 10 and the base station 20 performing the above-mentioned operations described so far are described below. Each of the user apparatus 10 and the base station 20 includes at least functions for implementing the embodiments 1 to 3. However, each of the user apparatus 10 and the base station 20 may include only a part of functions in the embodiments 1 to 3. Also, the user apparatus 10 and the base station 20 may have a function capable of executing the processing described in the basic example.

<User Apparatus>

Figure 15:
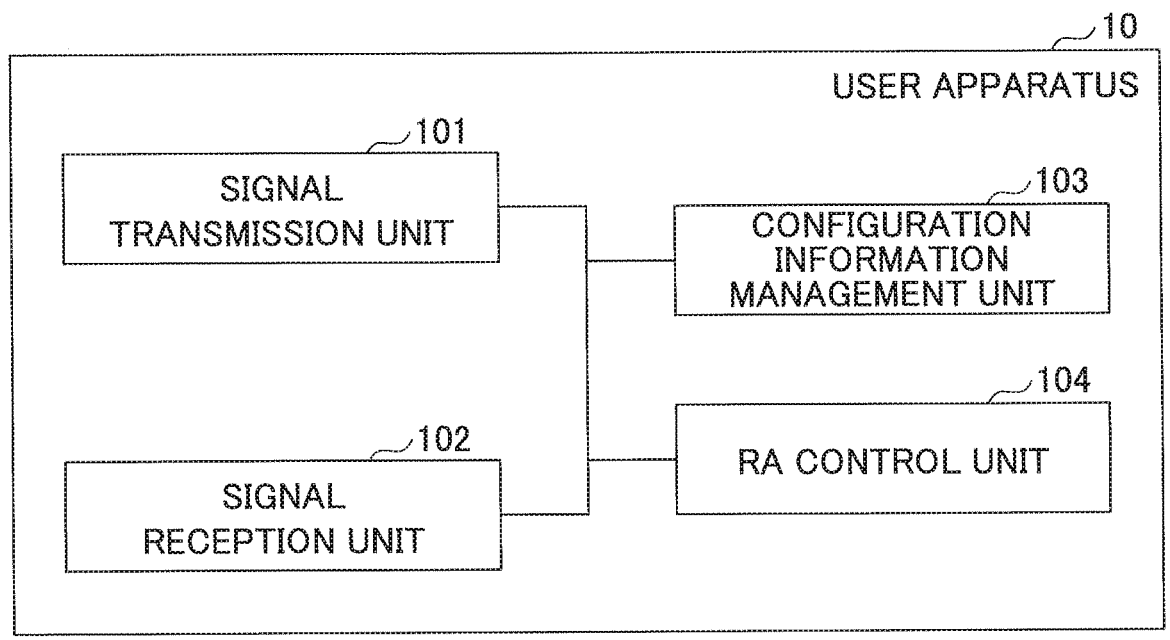
FIG. 15 is diagram showing an example of a functional configuration of the user apparatus 10.

FIG. 15 is a diagram illustrating an example of a functional configuration of the user apparatus 10. As illustrated in FIG. 15, the user apparatus 10 includes a signal transmission unit 101, a signal reception unit 102, a configuration information management unit 103, and a RA control unit 104. The functional configuration illustrated in FIG. 15 is only an example. Functional subdivision and names of the functional units are not particularly limited as long as the operations associated with the embodiment can be performed.

The signal transmission unit 101 generates a transmitting signal from transmission data to transmit the transmission signal by radio. The signal reception unit 102 receives by radio various signals, and obtains a signal of upper layer from a received signal of the physical layer. Also, the signal transmission unit 101 is configured to execute beamforming in the transmission side, and the signal reception unit 102 is configured to execute beamforming in the reception side. The signal transmission unit 101 may be referred to as a transmitter, and the signal reception unit 102 may be referred to as a receiver.

The configuration information management unit 103 stores various configuration information received from the base station 20 by the signal reception unit 102. Content of the configuration information is, for example, correspondence information described so far. Also, the configuration information management unit 103 stores configuration information preconfigured in the user apparatus 10.

The RA control unit 104 executes the processing of the random access procedure in the user apparatus 10 described in the embodiments 1-3. Note that a functional unit related to signal transmission in the RA control unit 104 may be included in the signal transmission unit 101 and a functional unit related to signal reception in the RA control unit 104 may be included in the signal reception unit 102.

Also, for example, the signal reception unit 102 is configured to receive a plurality of predetermined signals transmitted from the base station 20 using a plurality of beams, and the signal transmission unit 101 is configured to transmit a preamble using a plurality of resources corresponding to the plurality of beams, and the signal reception unit 102 is configured to receive, from the base station, system information including information of the plurality of resources corresponding to the plurality of beams, and the signal transmission unit 101 is configured to obtain the information of the plurality of resources from the system information.

Also, for example, the signal reception unit 102 is configured to receive a plurality of predetermined signals transmitted from the base station 20 using a plurality of beams, and the signal transmission unit 101 is configured to transmit a preamble using a plurality of resources corresponding to the plurality of beams, and the signal transmission unit 101 is configured to determine the plurality of resources corresponding to the plurality of beams based on relationship of resource positions among the plurality of predetermined signals received by the signal reception unit 102.

Also, for example, the signal reception unit 102 receives, from the base station 20, a notification indicating the number of preambles, a group of the preambles or the number of resources of the plurality of resources, and the signal transmission unit 101 transmits a preamble in accordance with the notification.

Also, for example, the signal reception unit 102 receives information for specifying a plurality of resources for uplink transmission corresponding to the plurality of resources, and the signal transmission unit 101 transmits a message to the base station 20 using each of the plurality of resources for uplink transmission.

<Base Station 20>

Figure 16:
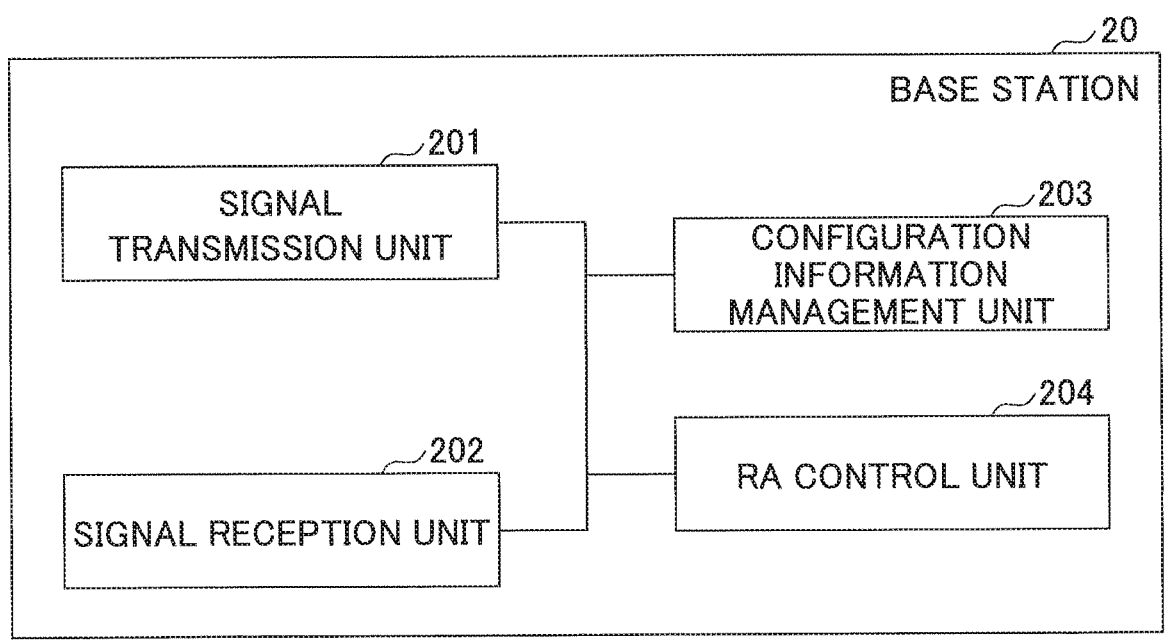
FIG. 16 is a diagram showing an example of a functional configuration of the base station 20.

FIG. 16 is a diagram illustrating an example of a functional configuration of the base station 20. As illustrated in FIG. 16, the base station 20 includes a signal transmission unit 201, a signal reception unit 202, a configuration information management unit 203 and a RA control unit 204. The functional configuration illustrated in FIG. 16 is only an example. Functional subdivision and names of the functional units are not particularly limited as long as the operations associated with the embodiment can be performed.

The signal transmission unit 201 includes a function configured to generate a signal to be transmitted to the user apparatus 10 side, and to transmit the signal by radio. The signal reception unit 202 includes a function configured to receive various signals transmitted from the user apparatus 10, and to obtain information of upper layer from the received signal. Also, the signal transmission unit 201 is configured to execute beamforming in the transmission side, and the signal reception unit 202 is configured to execute beamforming in the reception side. The signal transmission unit 201 may be referred to as a transmitter, and the signal reception unit 202 may be referred to as a receiver.

The configuration information management unit 203 stores various configuration information to be transmitted to the user apparatus 10. Content of the configuration information is, for example, correspondence information described so far. Also, the configuration information management unit 203 stores configuration information preconfigured in the base station 20.

The RA control unit 104 executes the processing of the random access procedure in the base station 20 described in the embodiments 1-3. Note that a functional unit related to signal transmission in the RA control unit 204 may be included in the signal transmission unit 201 and a functional unit related to signal reception in the RA control unit 204 may be included in the signal reception unit 202.

Also, for example, the signal transmission unit 201 is configured to transmit a plurality predetermined signals by a plurality of beams, and the signal reception unit 202 is configured to receive a preamble transmitted from the user apparatus 10 by using a plurality of resources corresponding to the plurality of beams, and the signal transmission unit 201 is configured to transmit system information including information indicating the plurality of resources used for transmission of a preamble in the user apparatus 10. The signal transmission unit 201 also includes a function for transmitting a RAR by the method described in the embodiment 3. Also, the signal transmission unit 201 may include a function for transmitting a beam ID by including it in basic system information.

<Hardware Configuration>

The block diagrams (FIGS. 15 and 16) which are used above to describe the embodiments illustrate blocks in the units of functions. The functional blocks (constituent units) are embodied in an arbitrary combination of hardware and/or software. Means for embodying the functional blocks is not particularly limited. That is, the functional blocks may be embodied by one unit in which a plurality of components are physically and/or logically coupled, or may be embodied by two or more devices which are physically and/or logically separated and which are connected directly and/or indirectly (for example, in a wired and/or wireless manner).

Figure 17:
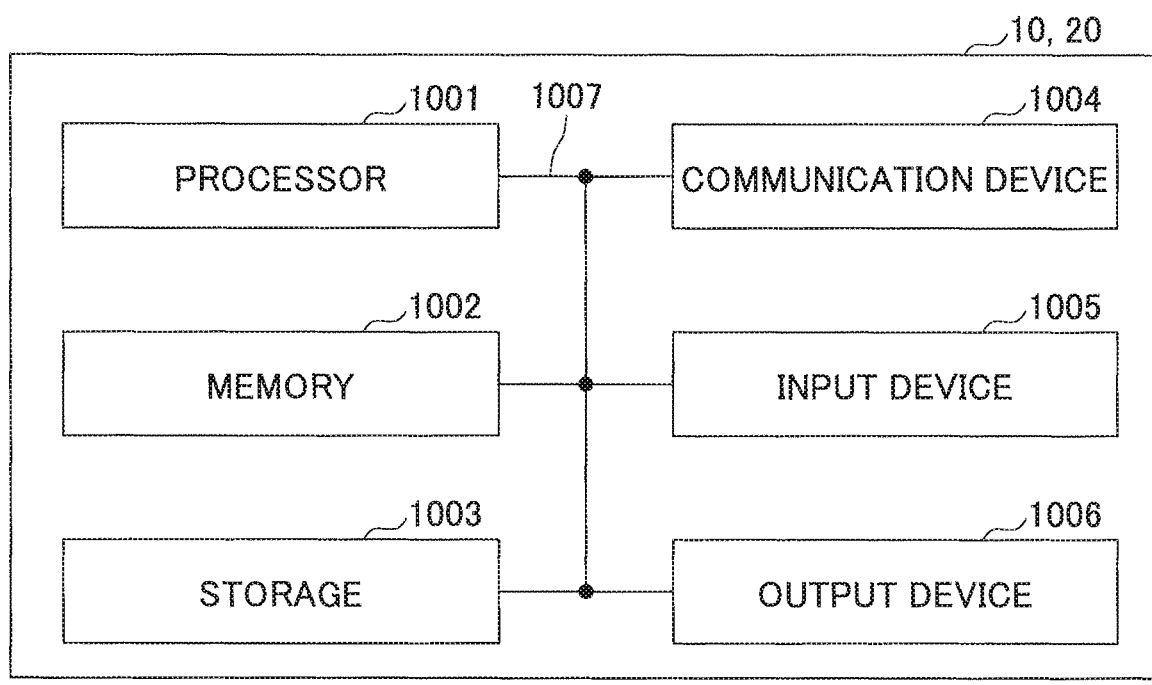
FIG. 17 is diagram showing an example of a hardware configuration of the user apparatus 10 and the base station 20.

For example, the user apparatus 10 and the base station 20 according to this embodiment may function as computers that perform the processes according to this embodiment. FIG. 17 is a diagram illustrating an example of a hardware configuration of the user apparatus 10 and the base station 20 according to this embodiment. The user apparatus 10 and the base station 20 may be physically configured as a computer device including a processor 1001, a memory 1002, a storage 1003, a communication device 1004, an input device 1005, an output device 1006, and a bus 1007.

In the following description, a word "device" may be referred to as a circuit, a device, a unit, or the like. The hardware configurations of the user apparatus 10 and the base station 20 may include one or more devices indicated by reference numerals 1001 to 1006 in the drawing or may not include some devices thereof.

The functions of the user apparatus 10 and the base station 20 are realized by causing hardware such as the processor 1001 and the memory 1002 to read predetermined software (a program) and causing the processor 1001 to perform calculation and to control communication of the communication device 1004 and reading and/or writing of data in the memory 1002 and the storage 1003.

The processor 1001 controls the computer as a whole, for example, by activating an operating system. The processor 1001 may be constituted by a central processing device (CPU: central processing unit) including an interface with peripherals, a control device, a calculation device, a register, and the like.

The processor 1001 reads a program (program codes), a software module, or data from the storage 1003 and/or the communication deice 1004 to the memory 1002 and performs various processes in accordance therewith. As the program, a program causing a computer to perform at least a part of the operations described above in the embodiment is used. For example, the signal transmission unit 101, the signal reception unit 102, the configuration information managing unit 103 and the RA control unit 104 of the user apparatus 10 shown in FIG. 15 may be embodied by a control program which is stored in the memory 1002 and operated by the processor 1001. The signal transmission unit 201, the signal reception unit 202, the configuration information management unit 203 and the RA control unit 204 of the base station 20 shown in FIG. 16 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage device). The memory 1002 can store a program (program codes), a software module, or the like which can be executed to perform the processes according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage device. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the signal transmission unit 101 and the signal reception unit 102 of the user apparatus 10 may be embodied by the communication device 1004. The signal transmission unit 201 and the signal reception unit 202 of the base station 20 may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The devices such as the processor 1001 and the memory 1002 are connected to each other via the bus 1007 for transmitting and receiving information. The bus 1007 may be constituted by a single bus or may be configured by different buses for the devices.

The user apparatus 10 and the base station 20 may be configured to include hardware such as a microprocessor, a digital signal processor (DSP), an application specific integrated circuit (ASIC), a programmable logic device (PhD), or a field programmable gate array (FPGA), or a part or all of the functional blocks may be embodied by the hardware. For example, the processor 1001 may be implemented by at least one hardware module of these.

Summary of Embodiments

As described above, according to the present embodiment, there is provided a user apparatus in a radio communication system including a base station and the user apparatus, including:

a reception unit configured to receive a plurality of predetermined signals transmitted from the base station using a plurality of beams; and a transmission unit configured to transmit a preamble using a plurality of resources corresponding to the plurality of beams, wherein the reception unit receives, from the base station, system information including information of the plurality of resources corresponding to the plurality of beams, and the transmission unit obtains the information of the plurality of resources from the system information.

According to the above-configuration, there is provided a technique that enables a radio communication system having a user apparatus and a base station to appropriately execute a random access procedure to which beamforming is applied.

Also, according to the present embodiment, there is provided a user apparatus in a radio communication system including a base station and a user apparatus, including:

a reception unit configured to receive a plurality of predetermined signals transmitted from the base station using a plurality of beams; and a transmission unit configured to transmit a preamble using a plurality of resources corresponding to the plurality of beams, wherein the transmission unit determines the plurality of resources corresponding to the plurality of beams based on relationship of resource positions among the plurality of predetermined signals received by the reception unit.

According to the above-configuration, there is provided a technique that enables a radio communication system having a user apparatus and a base station to appropriately execute a random access procedure to which beamforming is applied.

For example, the reception unit receives, from the base station, a notification indicating the number of preambles, a group of the preambles or the number of resources of the plurality of resources, and the transmission unit transmits a preamble in accordance with the notification. According to this configuration, probability of collision of preambles among user apparatuses can be reduced.

For example, the reception unit receives information for specifying a plurality of resources for uplink transmission corresponding to the plurality of resources, and the transmission unit transmits a message to the base station using each of the plurality of resources for uplink transmission. According to this configuration, the user apparatus can improve success probability of the random access procedure.

Also, according to the present embodiment, there is provided a base station in a radio communication system including the base station and a user apparatus, including:

a transmission unit configured to transmit a plurality predetermined signals by a plurality of beams; and a reception unit configured to receives a preamble transmitted from the user apparatus by using a plurality of resources corresponding to the plurality of beams, wherein the transmission unit transmits system information including information indicating the plurality of resources used for transmission of a preamble in the user apparatus.

According to the above-configuration, there is provided a technique that enables a radio communication system having a user apparatus and a base station to appropriately execute a random access procedure to which beamforming is applied.

Complement of Embodiment

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. The processing sequences described above may be changed in the order as long as they are not incompatible with each other. For the purpose of convenience of description, while a user apparatus 10 and a base station 20 have been described above with reference to functional block diagrams, such apparatuses may be embodied by hardware, by software, or by combination thereof.

Each of software which is executed by a processor of the user apparatus 10 and software which is executed by a processor of the base station 20 in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (ERA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 20 in this specification may be performed by an upper node thereof in some cases. In a network including one or more network nodes including a base station 20, various operations which are performed to communicate with a user apparatus 10 can be apparently performed by the base station 20 and/or network nodes (for example, an MME or an S-GW can be considered but the network nodes are not limited thereto) other than the base station 20. A case in which the number of network nodes other than the base station 20 is one has been described above, but a combination of plural different network nodes (for example, an MME and an S-GW) may be used.

The aspects described in this specification may be used alone, may be used in combination, or may be switched with implementation thereof.

The user apparatus 10 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 20 may be referred to as an NodeB (NB), an enhanced NodeB (eNB), a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform. "determining" or "deciding".

An expression "on the basis of" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

While the invention has been described above in detail, it is apparent to those skilled in the art that the invention is not limited to the embodiments described in the specification. The invention can be carried out as modified and changed embodiments without departing from the concept and scope of the invention which are defined by the appended claims. Accordingly, the description in this specification is made for illustrative description and does not have any restrictive meaning.

This patent application is based upon and claims the benefit of priority of Japanese Patent Application No. 2017-001460 filed on Jan. 6, 2017, and the entire contents of Japanese Patent Application No. 2017-001460 are incorporated herein by reference.

LIST OF REFERENCE SYMBOLS 10 user apparatus
101 signal transmission unit
102 signal reception unit
103 configuration information management unit
104 RA control unit
20 base station
201 signal transmission unit
202 signal reception unit
203 configuration information management unit
204 RA control unit
1001 processor
1002 memory
1003 storage
1004 communication device
1005 input device
1006 output device

The invention claimed is:

1. A terminal comprising:
a receiver configured to receive synchronization signal blocks corresponding to beams; and
a transmitter configured to transmit a preamble using one of resources corresponding to the synchronization signal blocks,
wherein the receiver receives a system information block (SIB), that is transmitted by a beam, out of SIBs transmitted by beams, and
wherein each of the SIBs includes information of the resources.

2. A preamble transmission method executed by a terminal, comprising:
a reception step of receiving synchronization signal blocks corresponding to beams; and
a transmission step of transmitting a preamble using one of resources corresponding to the synchronization signal blocks,
wherein, in the reception step, the terminal receives a system information block (SIB), that is transmitted by a beam, out of SIBs transmitted by beams, and
wherein each of the SIBs includes information of the resources.

3. A base station comprising:
a transmitter configured to transmit synchronization signal blocks corresponding to beams; and
a receiver configured to receive a preamble using one of resources corresponding to the synchronization signal blocks,
wherein the transmitter transmits system information blocks (SIBS) by beams, and
wherein each of the SIBs includes information of the resources.

4. A system comprising a terminal and a base station,
the terminal comprising:
a first receiver configured to receive synchronization signal blocks corresponding to beams; and
a first transmitter configured to transmit a preamble using one of resources corresponding to the synchronization signal blocks,
wherein the first receiver receives a system information block (SIB), that is transmitted by a beam, out of SIBs transmitted by beams, and wherein each of the SIBs includes information of the resources,
the base station comprising:
a second transmitter configured to transmit the synchronization signal blocks corresponding to the beams; and
a second receiver configured to receive the preamble using one of the resources corresponding to the synchronization signal blocks,
wherein the second transmitter transmits the system information blocks (SIBs) by the beams.

* * * * *